US012434501B2

(12) United States Patent
Nakahara

(10) Patent No.: US 12,434,501 B2
(45) Date of Patent: Oct. 7, 2025

(54) SHEET BONDING APPARATUS, SHEET PROCESSING APPARATUS, AND IMAGE FORMING APPARATUS

(71) Applicant: CANON KABUSHIKI KAISHA, Tokyo (JP)

(72) Inventor: Yasuhiro Nakahara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 18/515,800

(22) Filed: Nov. 21, 2023

(65) Prior Publication Data

US 2024/0174016 A1 May 30, 2024

(30) Foreign Application Priority Data

Nov. 24, 2022 (JP) ................................ 2022-187696

(51) Int. Cl.
*B65H 37/04* (2006.01)
*B42B 5/00* (2006.01)
*G03G 15/00* (2006.01)

(52) U.S. Cl.
CPC ............... *B42B 5/00* (2013.01); *B65H 37/04* (2013.01); *G03G 15/6541* (2013.01)

(58) Field of Classification Search
CPC .. B42B 5/00; G03G 15/6541; G03G 15/6544; B65H 2301/51614; B65H 2511/214; B65H 2801/27
USPC .............................. 412/37; 270/58.07, 58.08
See application file for complete search history.

(56) References Cited

U.S. PATENT DOCUMENTS 7,778,583 B2 * 8/2010 Katayama .......... G03G 15/2064 399/329
7,832,716 B2 * 11/2010 Wakabayashi ......... B65H 37/04 270/32
8,838,014 B2 * 9/2014 Matsue .............. G03G 15/6544 399/408
11,215,946 B2 1/2022 Koyama et al.
11,279,586 B2 3/2022 Nakahara
11,662,683 B2 5/2023 Koyama et al.
11,718,496 B2 8/2023 Nakahara
11,796,955 B2 10/2023 Monden et al.
(Continued)

FOREIGN PATENT DOCUMENTS

JP 2000-255881 A 9/2000
JP 2004-209859 A 7/2004
(Continued)

OTHER PUBLICATIONS

Search Report dated May 23, 2024, in European Patent Application No. 23211670.7.

*Primary Examiner* — Leslie A Nicholson, III
(74) *Attorney, Agent, or Firm* — Venable LLP

(57) ABSTRACT

A sheet bonding apparatus includes a pressurizing member configured to pressurize a sheet stack, a receiving member configured to receive a pressurizing force of the pressurizing member and nip the sheet stack together with the pressurizing member, a heating portion configured to heat the pressurizing member, a pressurizing mechanism configured to press the pressurizing member against the sheet stack, and an inclination correction mechanism configured to correct relative inclination between the pressurizing member and the receiving member in a case where the pressurizing member pressurizes the sheet stack.

14 Claims, 20 Drawing Sheets

(56) References Cited

U.S. PATENT DOCUMENTS

| | | | | |
|---|---|---|---|---|
| 12,084,302 | B2 * | 9/2024 | Kawamura | B42B 5/00 |
| 2003/0116264 | A1 * | 6/2003 | Boss | B42C 9/0081 156/275.1 |
| 2014/0072388 | A1 * | 3/2014 | Hashimoto | G03G 15/6544 412/1 |
| 2015/0063953 | A1 * | 3/2015 | Taguchi | B42C 1/12 412/37 |

FOREIGN PATENT DOCUMENTS

| | | | |
|---|---|---|---|
| JP | 2015-196567 | A | 11/2015 |
| SE | 1751073 | A1 | 3/2019 |
| WO | 2019/048447 | A1 | 3/2019 |

* cited by examiner

B-B

C-C

SHEET BONDING APPARATUS, SHEET PROCESSING APPARATUS, AND IMAGE FORMING APPARATUS

BACKGROUND OF THE INVENTION

Field of the Invention

The present invention relates to a sheet bonding apparatus that bonds sheets together, a sheet processing apparatus that performs processing on sheets, and an image forming apparatus that forms an image on a sheet.

Description of the Related Art

For a sheet bonding apparatus that bonds sheets together, Japanese Patent Laid-Open No. 2000-255881 and Japanese Patent Laid-Open No. 2004-209859 disclose configurations in which sheets are bonded together by heat-and-press bonding by applying toner thereon as an adhesive and heating and pressurizing the sheets.

In a sheet bonding apparatus of a heat-and-press bonding type, a sheet stack is nipped between a pressurizing member and a receiving member and is thus heated and pressurized. In this case, there is a possibility that a bonding failure occurs due to pressure unevenness caused by geometrical tolerance of an apparatus such as deviation of parallelism between the pressurizing member and the receiving member.

SUMMARY OF THE INVENTION

According to one aspect of the invention, a sheet bonding apparatus includes a pressurizing member configured to pressurize a sheet stack, a receiving member configured to receive a pressurizing force of the pressurizing member and nip the sheet stack together with the pressurizing member, a heating portion configured to heat the pressurizing member, a pressurizing mechanism configured to press the pressurizing member against the sheet stack, and an inclination correction mechanism configured to correct relative inclination between the pressurizing member and the receiving member in a case where the pressurizing member pressurizes the sheet stack.

Further features of the present invention will become apparent from the following description of exemplary embodiments with reference to the attached drawings.

DESCRIPTION OF THE EMBODIMENTS

Figure 1:
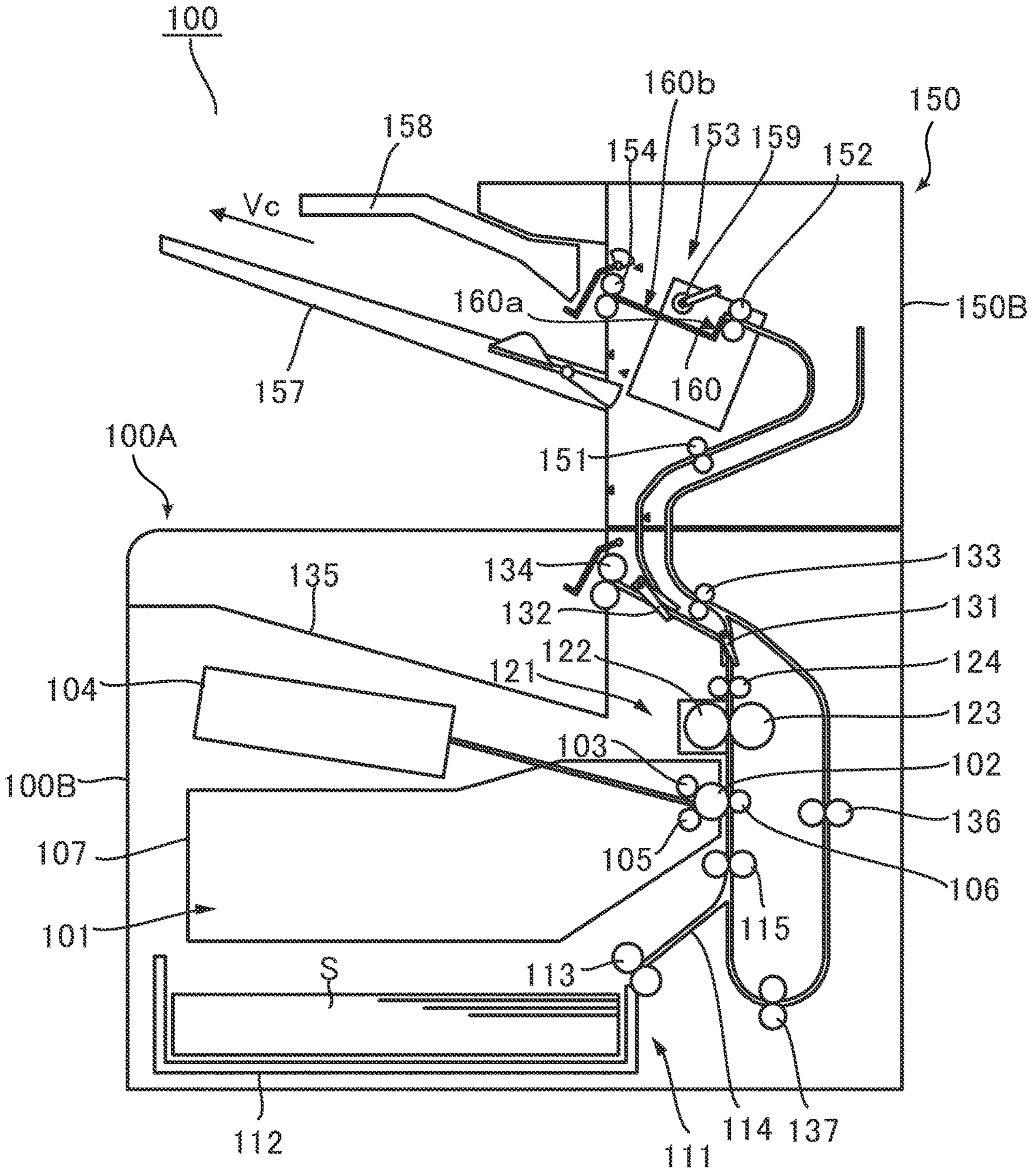
FIG. 1 is a schematic view of an image forming apparatus according to a first embodiment.

Embodiments of the present disclosure will be described below with reference to drawings. To be noted, in the present disclosure, examples of an "image forming apparatus" include a wide variety of apparatuses that form (record) an image on a recording material (recording medium) such as a monofunctional printer, a copier, a multifunctional apparatus, and a commercial printing machine. In addition, the image forming apparatus may be a system (image forming system) in which an image forming apparatus body that forms an image on a recording material is connected to devices such as a sheet processing apparatus and a sheet feeding apparatus.

First Embodiment

First, an overview of an image forming apparatus 100 according to a first embodiment will be described with reference to FIG. 1. The image forming apparatus 100 includes a printer body 100A serving as an image forming apparatus body having an image forming function (printing function), and a sheet processing apparatus 150 having a sheet bonding function. That is, it can be said that the image forming apparatus 100 is an image forming system constituted by the printer body 100A that functions as an image forming apparatus by itself, and the sheet processing apparatus 150.

The image forming apparatus 100 of the present embodiment is capable of forming images on a plurality of sheets S one sheet at a time by the printer body 100A, subjecting the sheets S to heat-and-press bonding in the sheet processing apparatus 150, and thus producing a booklet whose printing and bookbinding have been performed in one apparatus. To be noted, as the sheets S, a wide variety of sheet materials of different sizes and different materials can be used. Examples of the sheet materials include paper sheets such as plain paper sheets and cardboards, surface-treated sheet materials such as coated paper sheets, plastic films, cloths, and sheet materials of irregular shapes such as envelopes and index paper sheets.

Printer Body

The printer body 100A performs an image forming operation of forming images (toner images or developer images) on sheets S serving as recording materials by using toner while conveying the sheets S one by one, and discharging the sheets S to the sheet processing apparatus 150. The printer body 100A includes, as an image forming means or image forming unit, an image forming portion 101 accommodated in a casing 100B. The image forming portion 101 is an electrophotographic unit of a direct transfer system. The image forming portion 101 includes a photosensitive drum 102 serving as an image bearing member, a charging unit 103 serving as a charging means or charging portion, an exposing unit 104 serving as an exposing means or exposing portion, a developing roller 105 serving as a developing means or developing portion, a transfer roller 106 serving as a transfer means or transfer portion, and a toner container 107. The photosensitive drum 102 is a photosensitive member formed in a drum shape.

The toner container 107 accommodates black toner serving as developer and powder adhesive. That is, the toner of the present embodiment serves as developer for recording images on the sheets S and powder adhesive for bonding the sheets S together by a bonding process (heat-and-press bonding) in the sheet processing apparatus 150.

When start of image forming operation is requested to the printer body 100A, the photosensitive drum 102 of the image forming portion 101 is rotationally driven. The surface of the photosensitive drum 102 is uniformly charged by the charging unit 103, and is then exposed by the exposing unit 104. The exposing unit 104 exposes the photosensitive drum 102 on the basis of image information input from an external information processing apparatus, and thus an electrostatic latent image is formed on the surface of the photosensitive drum 102. The developing roller 105 supplies toner to the photosensitive drum 102, and thus the electrostatic latent image is visualized as a toner image. As will be described later, in the present embodiment, a toner image for recording an image on the sheet S and a toner image for bonding sheets together are formed simultaneously.

In addition, the printer body 100A includes a sheet feeding portion 111 that feeds the sheet S, and a fixing portion 121 that fixes the toner image to the sheet S. The sheet feeding portion 111 includes a feed cassette 112 serving as an accommodation portion that accommodates the sheets S, and a feed roller 113 serving as a feeding means or feeding portion. The fixing portion 121 is a fixing unit of a thermal fixation system that fixes the toner image to the sheet S by heating and pressurizing the toner image. The fixing portion 121 includes, for example, a fixing roller 122 serving as a fixing member, a pressurizing roller 123 serving as a pressurizing member that comes into pressure contact with the fixing member, and a heating means or heating portion that heats the fixing member. As the heating means or heating portion, for example, a halogen lamp that emits radiant heat, a heater board including a resistor heat generating element, an induction heating mechanism that generates heat in a conductive layer in the fixing roller 122, or the like can be used.

The sheet feeding portion 111 feeds sheets S accommodated in a feed cassette 112 one by one toward the image forming portion 101. The sheet S fed from the sheet feeding portion 111 passes a guide portion 114, is subjected to skew correction by a registration roller pair 115, and is delivered into a transfer portion that is a nip portion between the photosensitive drum 102 and a transfer roller 106. In the transfer nip portion, a toner image is transferred from the photosensitive drum 102 onto the sheet S. The sheet S having passed through the transfer portion is heated and pressurized while being nipped and conveyed between the fixing roller 122 and the pressurizing roller 123 of the fixing portion 121. As a result of this, the toner melts, and thus an image fixed to the sheet S can be obtained.

The sheet Shaving passed the fixing portion 121 is conveyed by a conveyance roller pair 124, and is guided to a conveyance path selected with a first switching guide 131. In the case of duplex printing in which an image is formed on each surface of the sheet S, the sheet S on a first surface of which an image has been formed is guided to a reverse conveyance roller pair 133 by the first switching guide 131. Then, the sheet S is switched back by the reverse conveyance roller pair 133, and is then conveyed to the image forming portion 101 again through duplex conveyance roller pairs 136 and 137, and an image is formed on a second surface of the sheet S opposite to the first surface.

In the case of simplex printing in which an image is formed on only one surface of the sheet S, or in the case of the sheet S on the second surface of which an image has been formed in the duplex printing, the sheet S is guided to a second switching guide 132 by the first switching guide 131, and is guided to a conveyance path selected with the second switching guide 132. In the case where processing (post-processing) by the sheet processing apparatus 150 is not to be performed on the sheet S, the sheet S is guided to a discharge roller pair 134 by the second switching guide 132. The discharge roller pair 134 discharges the sheet S to the outside of the casing 100B of the printer body 100A, and stacks the sheet S on a discharge supporting portion 135 provided on an upper portion of the casing 100B. In addition, in the case of performing processing (post-processing) by the sheet processing apparatus 150 on the sheet S, the sheet S is delivered to the sheet processing apparatus 150.

Figure 2A:
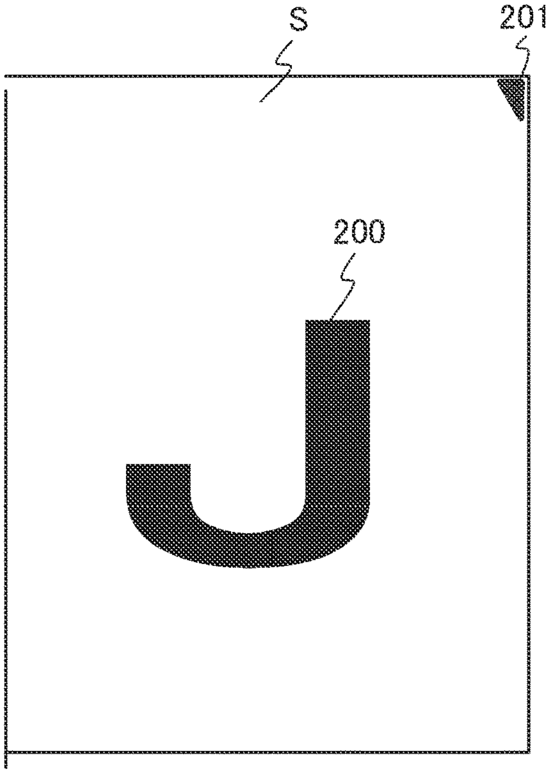
FIGS. 2A and 2B are each a diagram illustrating toner images that a printer body according to the first embodiment forms on a sheet.
Figure 2B:
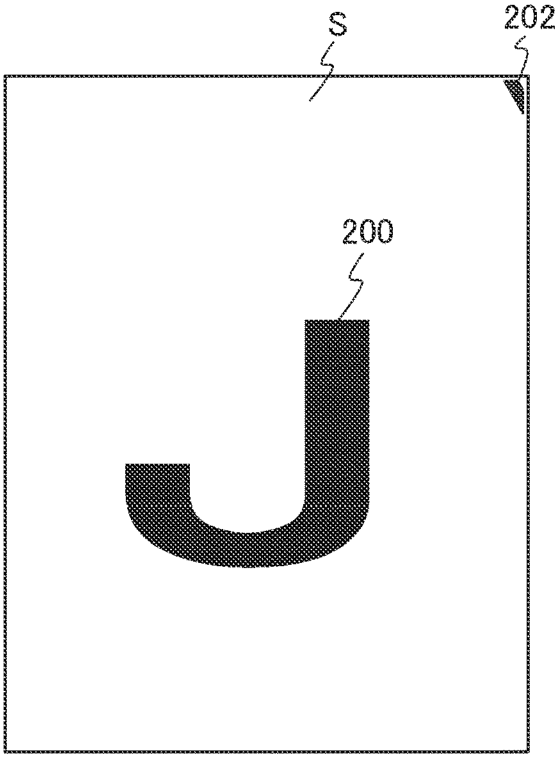

FIGS. 2A and 2B are each a diagram illustrating an example of a toner image formed on the sheet S. On the illustrated sheet S, a toner image (recording toner image) 200 for recording an image such as a text, a figure, or a photograph, and a toner image (bonding toner image) 201 or 202 for bonding sheets together are formed. The bonding toner image 201 or 202 is formed in a bonding region (gluing margin) for bonding sheets together. In the sheet processing apparatus 150 of the present embodiment, corner binding in which a corner portion of the sheet stack is bonded can be performed, and the bonding region is set in the corner portion. The position, shape, and size of the bonding toner image 201 or 202 can be changed in accordance with the specifications of the sheet processing apparatus 150.

To be noted, in the case where the image forming apparatus 100 produces a booklet by simplex printing, the bonding toner image 201 or 202 is formed on only one surface (surface on which the recording toner image is formed) of each sheet S. In the case of a booklet produced by duplex printing, the bonding toner image 201 or 202 may be formed on only one surface or both surfaces of each sheet S.

Sheet Processing Apparatus

The sheet processing apparatus 150 will be described. As illustrated in FIG. 1, the sheet processing apparatus 150 is mounted on an upper portion of the casing 100 of the printer body 100A.

In a processing apparatus body 150B of the sheet processing apparatus 150, an inlet roller pair 151, a heat-and-press bonding portion 153, and a discharge roller pair 154 are disposed, and the processing apparatus body 150B includes a stage roller pair 152, a jogger 158, an alignment roller 159, a processing stage 160, and a discharge tray 157. The heat-and-press bonding portion 153 is an example of a sheet bonding apparatus (bonding unit, bonding means, heat-and-press bonding means, or sticking processing portion) that bonds sheets together.

The inlet roller pair 151 receives the sheet S discharged from the printer body 100A, and conveys the received sheet S toward the heat-and-press bonding portion 153. The stage roller pair 152 conveys the sheet S conveyed from the inlet roller pair 151 to the processing stage 160. The processing stage 160 is an example of a stacking portion or supporting portion (intermediate supporting portion) on which a sheet stack to be processed by the heat-and-press bonding portion 153 is stacked or supported. In addition, the inlet roller pair 151 and the stage roller pair 152 are each an example of a conveyance means or conveyance mechanism that conveys sheets one by one to stack the sheets on the stacking portion or supporting portion.

The jogger 158 is a pair of members opposing each other in a sheet width direction orthogonal to a sheet conveyance direction Vc (sheet discharge direction of the discharge roller pair 154). The jogger 158 has a function of supporting part of a sheet stack supported on the processing stage 160 (downstream portion of the sheet stack in the sheet conveyance direction Vc). The alignment roller 159 moves the sheets S supported by the processing stage 160 and the jogger 158 in a direction opposite to the sheet conveyance direction Vc. As a result of this, the sheet S is caused to abut an alignment wall 160*a* provided at an end portion of the processing stage 160, and thus the sheet stack is aligned in the sheet conveyance direction Vc. The jogger 158 moves the plurality of sheets S aligned by the alignment roller 159 in the sheet width direction, and delivers the sheets S to a predetermined position where processing by the heat-and-press bonding portion 153 is performed. The predetermined position is a position where the bonding toner image 201 or 202 illustrated in FIGS. 2A and 2B is right under a pressure plate 306 of the heat-and-press bonding portion 153. To be noted, the sheets S are stacked and aligned on the processing stage 160 while the discharge roller pair 154 is in a separated state. The jogger 158 and the alignment roller 159 are each an example of an alignment means or alignment portion that aligns the sheet stack supported on the processing stage 160.

The heat-and-press bonding portion 153 performs heat-and-press bonding on the sheet stack. In the present embodiment, by repeating an operation of performing heat-and-press bonding each time a preset number (for example, four) of sheets are stacked on the processing stage 160, a booklet formed from a larger number (for example, tens) of sheets can be formed as a product.

The discharge roller pair 154 is an example of a discharge means or discharge portion that discharges the sheet stack for which the processing by the heat-and-press bonding portion 153 has been completed. When the processing by the heat-and-press bonding portion 153 is completed, the discharge roller pair 154 nips the stack of the sheets S that have been stacked, aligned, and subjected to heat-and-press bonding. The booklet formed by the heat-and-press bonding portion 153 is discharged to the outside of the processing apparatus body 150B by the discharge roller pair 154. At the time of discharge, the jogger 158 retracts from the lower surface of the booklet so as to drop the booklet onto the discharge tray 157. The jogger 158 retracts at such a timing that a current booklet currently discharged does not catch a preceding booklet that has been previously discharged onto the discharge tray 157 after the jogger retracted from the lower surface of the current booklet.

The discharge tray 157 is an example of a discharge supporting portion on which the sheet stack (booklet) processed by the heat-and-press bonding portion 153 is discharged and supported. The discharge tray 157 is supported by the processing apparatus body 150B so as to be movable in the up-down direction.

Heat-and-Press Bonding Portion

The configuration of the heat-and-press bonding portion 153 will be described with reference to FIGS. 2C and 3A to 3H. In the following descriptions and drawings, a direction in which the pressurizing member moves with respect to the receiving member to pressurize the sheet stack in the heat-and-press bonding portion 153 will be referred to as a Z direction. The Z direction is the height direction (thickness direction) of the sheet stack placed on the processing stage 160. In addition, directions orthogonal to each other in a virtual plane orthogonal to the Z direction will be respectively referred to as an X direction and a Y direction. If necessary, the sides respectively indicated by arrows X, Y, and Z in each diagram will be expressed as the +X side, +Y side, and +Z side, and sides opposite thereto will be expressed as the −X side, −Y side, and −Z side.

Figure 2C:
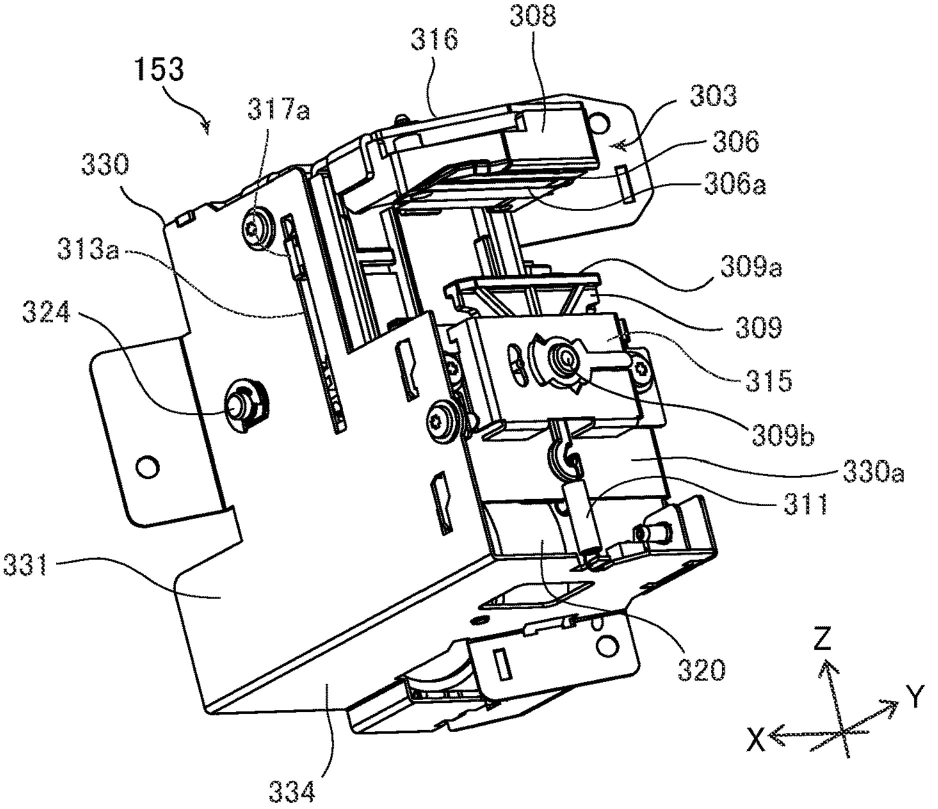
FIG. 2C is a perspective view of a heat-and-press bonding portion according to the first embodiment.
Figure 3A:
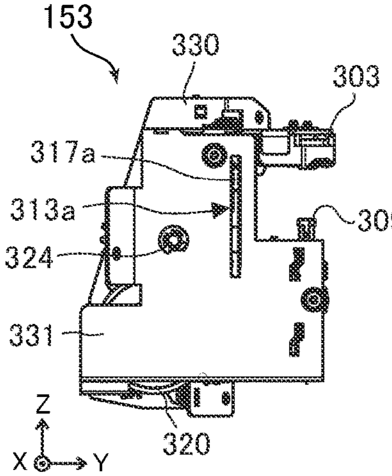
FIGS. 3A to 3H are each a diagram for describing the heat-and-press bonding portion according to the first embodiment.
Figure 3B:
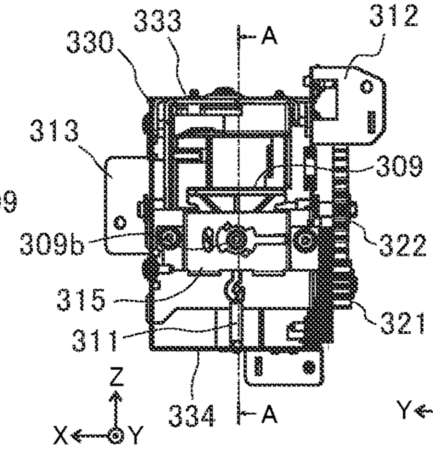
Figure 3C:
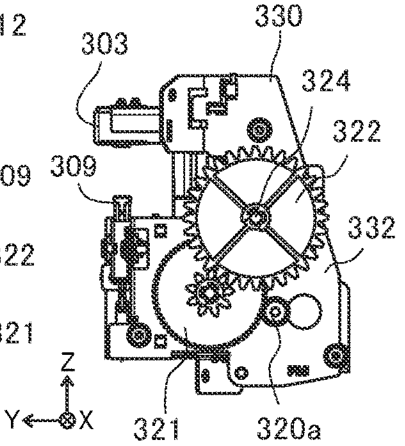
Figure 3D:
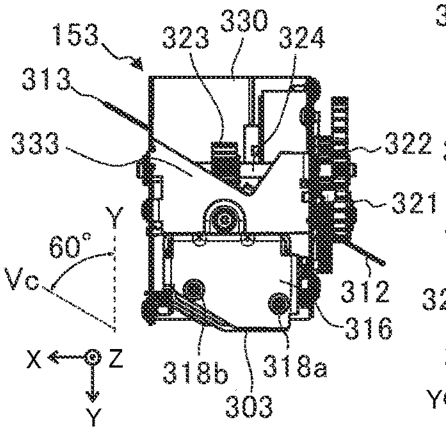
Figure 3E:
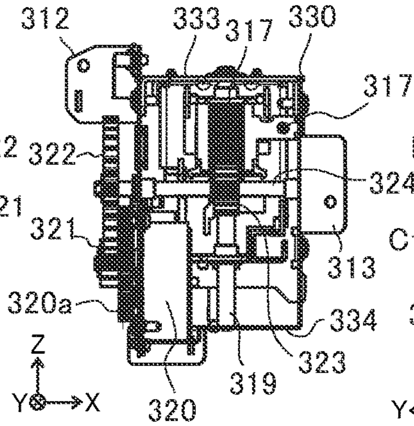
Figure 3F:
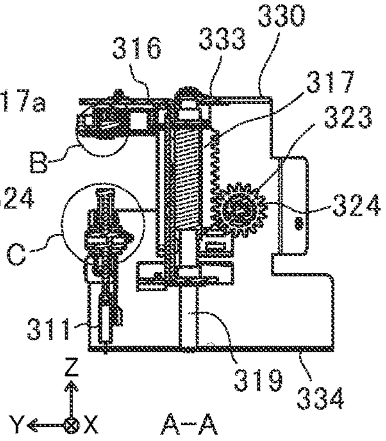
Figure 3G:
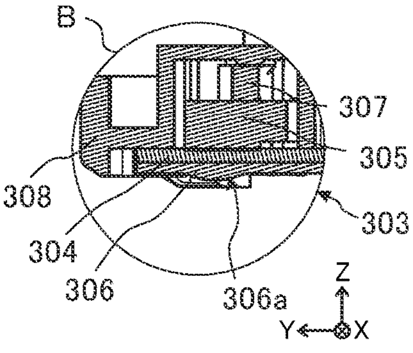
Figure 3H:
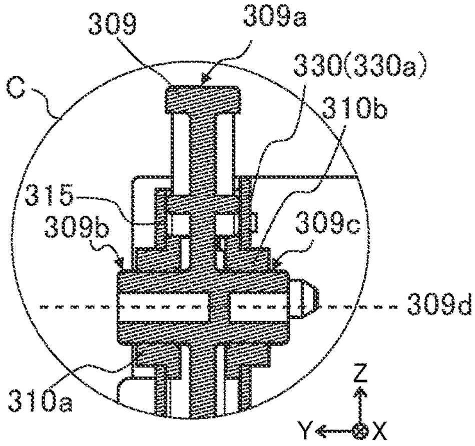

FIG. 2C is a perspective view of the heat-and-press bonding portion 153. FIG. 3A is a diagram illustrating the heat-and-press bonding portion 153 as viewed from the +X side. FIG. 3B is a diagram illustrating the heat-and-press bonding portion 153 as viewed from the +Y side. FIG. 3C is a diagram illustrating the heat-and-press bonding portion 153 as viewed from the −X side. FIG. 3D is a diagram illustrating the heat-and-press bonding portion 153 as viewed from the +Z side. FIG. 3E is a diagram illustrating the heat-and-press bonding portion 153 as viewed from the −Y side. FIG. 3F is a section view illustrating the cross-section of the heat-and-press bonding portion 153 taken along a line A-A in FIG. 3B as viewed from the −X side. FIGS. 3G and 3H are respectively enlarged views of regions B and C illustrated in FIG. 3F.

As illustrated in FIGS. 2C and 3A, the heat-and-press bonding portion 153 includes a heater portion 303, a receiving part 309, a main chassis 330, and a driving system including a motor 320. The main chassis 330 constitutes a frame body of the heat-and-press bonding portion 153. The heater portion 303 is capable of reciprocating (sliding) in the Z direction with respect to the main chassis 330.

The heat-and-press bonding portion 153 performs heat-and-press bonding of the sheets by moving the heater portion 303 by the driving force of the motor 320 serving as a drive source and heating and pressurizing the sheet stack while nipping the sheet stack between the heater portion 303 and the receiving part 309. The configuration of each part of the heat-and-press bonding portion 153 will be described below.

Lifting/Lowering Operation of Heater Portion

The configuration of the driving system that lifts and lowers the heater portion 303 and the lifting/lowering operation of the heater portion 303 will be described with reference to FIGS. 3A to 3E. The main chassis 330 includes a first side plate 331, a second side plate 332, a top plate 333, and a bottom plate 334. The first side plate 331 and the second side plate 332 oppose each other in the X direction, and the top plate 333 and the bottom plate 334 oppose each other in the Z direction. In addition, a support metal plate 315 illustrated in FIG. 3B is fixed to the main chassis 330. The support metal plate 315 is a member that positions the receiving part 309 by sandwiching the receiving part 309 with a support portion 330*a* of the main chassis 330 illustrated in FIG. 3H, and supports the receiving part 309 together with the support portion 330*a*. The main chassis 330 and the support metal plate 315 constitute the frame body of the heat-and-press bonding portion 153.

The main chassis 330 includes attachment portions 312 and 313 for attaching the heat-and-press bonding portion 153 to the processing apparatus body 150B. The heat-and-press bonding portion 153 of the present embodiment is fixed in an oblique orientation with respect to the sheet conveyance direction Vc illustrated in FIG. 3D in the state of being attached to the processing apparatus body 150B via the attachment portions 312 and 313. Specifically, the attachment orientation of the heat-and-press bonding portion 153 is determined such that the angle between a straight line of the Y direction of the heat-and-press bonding portion 153 and the straight line of the sheet conveyance direction Vc is 60°. The attachment orientation of the heat-and-press bonding portion 153 is not limited to this, and can be changed in accordance with the specifications of the sheet processing apparatus 150 such as the position and shape of the bondable range.

The heat-and-press bonding portion 153 includes a lining/lowering stay 316 illustrated in FIGS. 3D, 3F, and 3G that is movable with respect to the main chassis 330. The lining/lowering stay 316 is a metal plate part that holds the heater portion 303 and a rack gear 317. The heater portion 303 and the rack gear 317 are fixed to the lifting/lowering stay 316 via push nuts 318*a* and 318*b*, unillustrated mechanical fastening parts, or the like.

The driving system of the heat-and-press bonding portion 153 includes the motor 320, a pinion gear 320*a*, gears 321, 322, and 323, and the rack gear 317 as illustrated in FIGS. 3C, 3E, and 3F. The driving system including the motor 320 is an example of a pressurizing means or pressurizing mechanism that presses the pressurizing member against the sheet stack. The motor 320 is an example of a drive source for moving the heater portion 303 with respect to the receiving part 309 and pressing the pressure plate 306 illustrated in FIG. 3G against the sheet stack. The pinion gear 320*a*, the gears 321, 322, and 323, and the rack gear 317 are an example of a drive transmission mechanism that converts the rotation of the motor 320 to a motion in the movement direction of the heater portion 303, that is, the Z direction, and transmits the converted force to the heater portion 303.

The rack gear 317 is guided by a guide shaft 319 illustrated in FIG. 3F having a columnar shape extending in the Z direction, and reciprocates in the Z direction. The guide shaft 319 is fixed to the main chassis 330. The heater portion 303 reciprocates in the Z direction integrally with the rack gear 317 via the lining/lowering stay 316.

An elongated hole 313*a* substantially parallel to the extending direction of the guide shaft 319 is provided in the first side plate 331 of the main chassis 330 as illustrated in FIGS. 2C and 3A. A rib 317*a* provided on the rack gear 317 fits in this elongated hole 313*a*. As a result of the rib 317*a* fitting in the elongated hole 313*a*, the rack gear 317 is positioned (locked) so as not to rotate about the guide shaft 319. The rib 317*a* and the elongated hole 313*a* is an example of a rotation suppression mechanism, and a different rotation suppression mechanism such as spline engagement may be used.

The pinion gear 320*a* is attached to the output shaft of the motor 320, and engages with a large-diameter gear portion of the gear 321 that is a stepped gear wheel illustrated in FIG. 3C. A small-diameter gear portion of the gear 321 engages with the gear 322. The gear 323 engages with the rack gear 317, and is attached to a shaft 324 to which the gear 322 is attached. The shaft 324 penetrates through the gears 322 and 323, and is rotatably supported by the first side plate 331 and the second side plate 332 of the main chassis 330 as illustrated in FIGS. 3A and 3E. The gears 322 and 323 integrally rotate via the shaft 324. In addition, the pitch radius of the gear 323 is smaller than the pitch radius of the gear 322.

According to the configuration described above, the driving force of the motor 320 is transmitted through the pinion gear 320*a*, the gears 321, 322, and 323, and the rack gear 317, and the heater portion 303 slides in the Z direction. In addition, the heater portion 303 ascends and descends to the +Z side and −Z side in accordance with the rotational direction of the motor 320.

The pinion gear 320*a*, the gears 321, 322, and 323, and the rack gear 317 constitute a speed reduction mechanism for obtaining a pressurizing force required for the heat-and-press bonding of the sheet stack. To be noted, as the speed reduction mechanism, for example, a worm gear or a planetary gear mechanism may be used.

Heater Portion

The configuration of the heater portion 303 will be described with reference to FIGS. 3F and 3G. The heater portion 303 includes a heater 304, a pressure plate 306, a thermoswitch 305, a compression spring 307, and a heater base 308.

The heater 304 is an example of a heating means or heating portion that heats the pressurizing member. In addition, the heater 304 is an example of a heating means or heating portion that heats the sheet stack serving as a bonding target. The heater 304 of the present embodiment is a circuit board in which a heat generating circuit including a heat generating resistor and a thermistor circuit for temperature detection are formed on an insulating substrate formed from alumina. The insulating substrate has a plate shape extending in the X direction and the Y direction whose thickness direction is the Z direction, and is in contact with the pressure plate 306 on one side in the Z direction (−Z side in the present embodiment). The heat generating circuit and the thermistor circuit are disposed on the side of the board opposite to the side that comes into contact with the pressure plate 306 in the Z direction (that is, on the +Z side). When power is supplied to the heat generating circuit, heat is transmitted through the insulating substrate, and thus the pressure plate 306 is heated.

The pressure plate 306 is an example of a pressurizing member that nips the sheet stack with the receiving part 309 serving as a receiving member and pressurizes the sheet stack. The pressure plate 306 has a contact surface 306*a* that comes into contact with the sheet stack on one side in the Z direction (−Z side).

In the present embodiment, at least part of the contact surface 306*a* is formed as a ridge portion (projection portion) having a sectional shape projecting toward the −Z side (pressurizing direction side) as viewed in the X direction and extending in the X direction. The ridge portion 306*a* of the contact surface 306*a* is, for example, a curved surface having an arcuate shape as viewed in the X direction. The effect of the ridge portion of the contact surface 306*a* will be described later.

The thermoswitch 305 is an example of a safety device. The thermoswitch 305 is configured to, in the case where abnormal heat is generated due to abnormality of a control system or the like, detect the abnormal heat, cancel physical connection with the heat generating circuit, and thus block the power supply to the heat generating circuit.

The compression spring 307 is disposed between a heater base 308 and the thermoswitch 305. The heater base 308 holds the heater 304, the pressure plate 306, the thermoswitch 305, and the compression spring 307. In addition, the heater base 308 is held by the lifting/lowering stay 316.

The pressure plate 306 is fixed to the heater base 308. The heater 304, the thermoswitch 305, and the compression spring 307 are sandwiched between the pressure plate 306 and the heater base 308. The thermoswitch 305 and the heater 304 are pressed against the pressure plate 306 by the urging force of the compression spring 307. According to this configuration, the heat of the heater 304 can be efficiently transmitted to the pressure plate 306.

Receiving Portion

The configuration of the receiving portion opposing the heater portion 303 will be described with reference to FIGS. 3F and 3H. The receiving portion includes the receiving part 309 serving as an example of a receiving member.

The receiving part 309 has a contact surface 309*a* that comes into contact with the sheet stack on one side in the Z direction (+Z side). The receiving part 309 opposes the pressure plate 306 of the heater portion 303 in the Z direction. The contact surface 309*a* of the receiving part 309 and the contact surface 306*a* of the pressure plate 306 oppose each other in the Z direction, and overlap with each other as viewed in the Z direction. To be noted, two elements overlapping with each other as viewed in a certain direction refers to a state in which a projection region of one element at least partially overlaps with a projection region of the other element in the case where each element is orthogonally projected onto a virtual plane orthogonal to the certain direction.

In the present embodiment, the contact surface 309*a* of the receiving part 309 has a thin rectangular shape elongated in the X direction. In addition, in a state in which the pressurizing force from the pressure plate 306 is not acting, the contact surface 309*a* is substantially a flat surface.

As illustrated in FIG. 3H, the receiving part 309 includes shaft portions 309*b* and 309*c* extending in a direction intersecting with (preferably orthogonal to) the Z direction. The receiving part 309 of the present embodiment includes the shaft portions 309*b* and 309*c* respectively projecting to the +Y side and the −Y side along the Y direction with respect to the contact surface 309*a*. The shaft portion 309*b* is pivotably supported by a bearing 310*a*, and the shaft portion 309*c* is pivotably supported by a bearing 310*b*. The shaft portions 309*b* and 309*c* are each an example of a shaft portion (first shaft portion) that extends in a first direction and that enables the receiving member to tilt about the shaft portion. The bearing 310*a* is attached to the support metal plate 315 fixed to the main chassis 330, and the bearing 310*b* is attached to the support portion 330*a* of the main chassis 330.

The receiving part 309 is capable of tilting such that the contact surface 309*a* is inclined to the left and right from the viewpoint of FIG. 3B about an axis 309*d* extending in the Y direction. The receiving part 309 is positioned in the Y direction by being sandwiched between the support metal plate 315 and the support portion 330*a* of the main chassis 330. In addition, also from the viewpoint of securing the stiffness for enduring the pressurizing force from the pressure plate 306, the receiving part 309 is preferably configured to be supported on both sides in the direction of the axis 309*d* as described above.

As illustrated in FIGS. 3B and 3F, the receiving part 309 is urged by a tension spring 311. The tension spring 311 is engaged with a hook portion of the receiving part 309, and urges the hook portion in the −Z direction. A position where the moment acting on the receiving part 309 by the urging force of the tension spring 311 is 0 in the pivot direction about the axis 309*d* will be referred to as a neutral position (standard position) of the receiving part 309. When the receiving part 309 pivots in either one side in the pivot direction from the neutral position, a moment to return to the neutral position acts on the receiving part 309 by the urging force of the tension spring 311.

The contact surface 309*a* of the receiving part 309 is preferably designed to be not inclined when the receiving part 309 is at the neutral position. The state in which the contact surface 309*a* is not inclined is a state in which the contact surface 309*a* is substantially orthogonal to the Z direction as viewed in the direction of the axis 309*d* (Y direction).

To be noted, the tension spring 311 is an example of an urging means or urging member that urges the receiving part 309. In the case where the position of the hook portion with respect to the axis 309*d* is changed, the position of the tension spring 311 for urging the receiving part 309 toward the neutral position is also changed. In addition, an elastic member such as a torsion coil spring or rubber may be used as the urging means (urging member) instead of the tension spring 311. Further, the urging means (urging member) is not limited to a member that uses an elastic force, and a magnet that urges the receiving part 309 by a magnetic force, or a weight that urges the receiving part 309 by the gravity may be used.

Contact Surface of Receiving Part

Figure 4A:
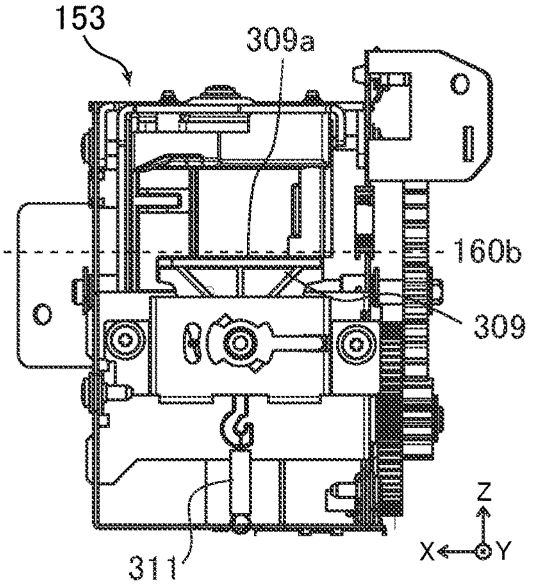
FIGS. 4A to 4D are each a diagram for describing the heat-and-press bonding portion according to the first embodiment.
Figure 4B:
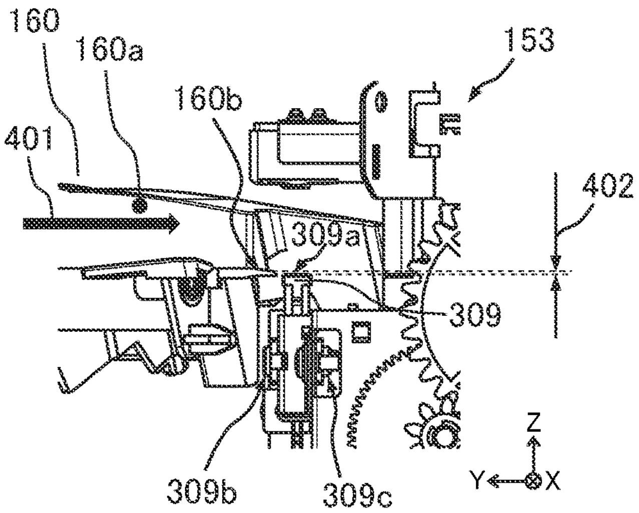
Figure 4C:
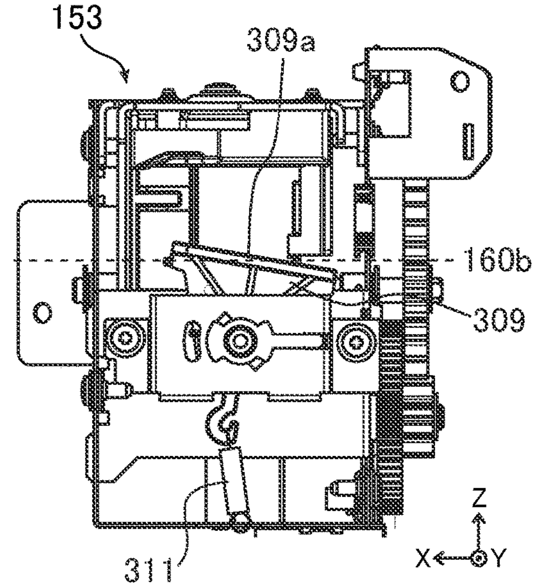
Figure 4D:
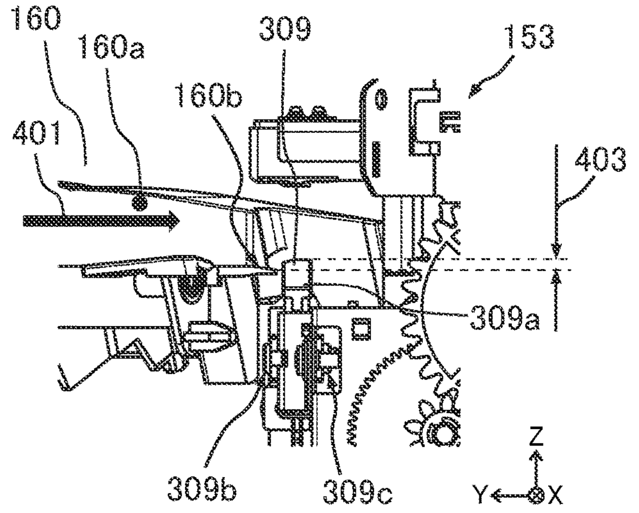

The orientation of the receiving part 309 will be described with reference to FIGS. 4A to 4D. FIG. 4A is a diagram illustrating the heat-and-press bonding portion 153 as viewed from the +Y side in a state in which the receiving part 309 is at the neutral position. FIG. 4B is a diagram illustrating part of the heat-and-press bonding portion 153 of FIG. 4A as viewed from the −X side. FIG. 4C is a diagram illustrating the heat-and-press bonding portion 153 as viewed from the +Y side in a state in which the receiving part 309 is inclined. FIG. 4D is a diagram illustrating part of the heat-and-press bonding portion 153 of FIG. 4C as viewed from the −X side. To be noted, in FIGS. 4A and 4C, the height of a sheet supporting surface 160*b* of the processing stage 160 is indicated by a virtual line.

As described above, sheets stacked on the processing stage 160 are aligned by being caused to abut the alignment wall 160*a*, and are then delivered into the heat-and-press bonding portion 153 by the jogger 158 illustrated in FIG. 1. An arrow 401 of FIGS. 4B and 4D indicates a direction in which the sheet stack is delivered into the heat-and-press bonding portion 153 by the jogger 158. The heat-and-press bonding portion 153 has a space open toward one side in the direction of the axis extending in the receiving part 309 (Y direction) between the heater portion 303 and the receiving part 309, and the sheet stack is delivered into this space.

As illustrated in FIGS. 4A and 4B, the contact surface 309*a* of the receiving part 309 is configured to be a downward step with respect to the sheet supporting surface 160*b* of the processing stage 160 in the case where the receiving part 309 is at the neutral position. In other words, the contact surface 309*a* of the receiving part 309 is configured to be lower than the height of an end portion of the sheet supporting surface 160*b* on the receiving part 309 side by a predetermined height difference 402. To be noted, the height mentioned herein refers to the position in the Z direction, and the height direction does not have to match the gravity direction (vertical direction). That is, it suffices as long as the contact surface 309*a* is positioned on the −Z side with respect to the end portion of the sheet supporting surface 160*b* on the receiving part 309 side.

If the contact surface 309*a* of the receiving part 309 is a downward step with respect to the sheet supporting surface 160*b* of the processing stage 160, the edge of the sheet stack is less likely to be caught by the receiving part 309 when the sheet stack is delivered thereto in the direction of the arrow 401.

In contrast, in the case where the receiving part 309 is inclined as illustrated in FIGS. 4C and 4D, one end portion of the contact surface 309*a* can be an upward step with respect to the sheet supporting surface 160*b* of the processing stage 160. In other words, part of the contact surface 309*a* of the receiving part 309 can be higher than the height of the end portion of the sheet supporting surface 160*b* on the receiving part 309 side by a height difference 403. In this case, an edge of the sheet stack sheet stack can be caught by the receiving part 309 when the sheet stack is delivered thereto in the direction of the arrow 401, and inconvenience such as a sheet jam, corner folding, or bonding failure can occur.

Here, in the present embodiment, in a state before the heat-and-press bonding portion 153 receives the sheet stack, the orientation of the receiving part 309 is maintained at the neutral position by the tension spring 311 serving as an urging means or urging member (first urging means or first urging member). In other words, the tension spring 311 urges the receiving part 309 such that the receiving part 309 is in such an orientation that the height of the contact surface 309*a* is equal to or less than the height of the sheet supporting surface 160*b* in the entire region of the contact surface 309*a* as viewed in the direction of the axis 309*d*. According to this configuration, in a configuration in which the receiving part 309 capable of tilting is used, the possibility of a jam or the like caused by an upward step relationship between the processing stage 160 and the receiving part 309 can be reduced.

Equalizing Mechanism

When the heat-and-press bonding is performed in a state in which the contact surface 306*a* of the heater portion 303 or the contact surface 309*a* of the receiving part 309 is inclined about the Y axis or the X axis described above, the pressure applied to the sheet stack becomes uneven, and a bonding failure can occur. That is, when the pressurizing force in the Z direction per unit area that the region where the bonding toner image 201 or 202 illustrated in FIGS. 2A and 2B is formed receives is uneven, a bonding failure can occur.

The bonding failure refers to a case where regions where the bonding toner image 201 or 202 is formed cannot be evenly bonded at a desired bonding strength. In the case where a bonding failure has occurred, for example, there is a possibility that the sheets in the sheet stack are peeled off from each other due to the lack of bonding strength.

Therefore, in the present embodiment, as an equalizing means (pressure equalizing mechanism) that equalizes the pressurizing force acting on the sheet stack, an inclination correction mechanism is provided. The inclination correction mechanism equalizes the distribution of the pressurizing force acting on the sheet stack from the pressure plate 306 and the receiving part 309 by absorbing (i.e., correcting) relative inclination between the contact surfaces 306*a* and 309*a* at the time of heat-and-press bonding.

The inclination correction mechanism is configured to absorb or correct the inclination about at least one axis intersecting with the pressurizing direction (Z direction). In other words, the inclination correction mechanism is configured to maintain the contact area between the pressure plate 306 and the sheet stack and the contact area between the receiving part 309 and the sheet stack even in the case where the pressure plate 306 or the receiving part 309 is inclined about at least one axis (degree of freedom: 1) intersecting with the pressurizing direction (Z direction).

In addition, the arbitrary relative inclination between the pressure plate 306 and the receiving part 309 is expressed as pivoting about an axis extending in one direction among 360° in a plane orthogonal to the Z direction. The pivoting about this axis can be also expressed as a combination of pivoting about the X axis and pivoting about the Y axis. The equalizing means (inclination correction mechanism) is preferably capable of absorbing inclination of a degree of freedom of 4 in the case where the pressure plate 306 and the receiving part 309 are each inclined in an arbitrary direction with respect to a plane (X-Y plane) orthogonal to the pressurizing direction (Z direction).

Therefore, in the present embodiment, as an equalizing means (inclination correction mechanism), an inclination correction mechanism about the Y axis and an inclination correction mechanism about the X axis are provided. The inclination correction mechanism about the Y axis allows the pressure plate 306 or the receiving part 309 to tilt about the axis extending in the Y direction. The inclination correction mechanism about the X axis allows the pressure plate 306 or the receiving part 309 to tilt about the axis extending in the X direction. As a result of this, relative inclination between the pressure plate 306 and the receiving part 309 about an arbitrary axis can be absorbed, and thus the bonding failure can be made less likely to occur.

The inclination correction mechanism about the Y axis and the inclination correction mechanism about the X axis in the present embodiment will be described in detail below.

Inclination Correction Mechanism about Y Axis

Figure 5A:
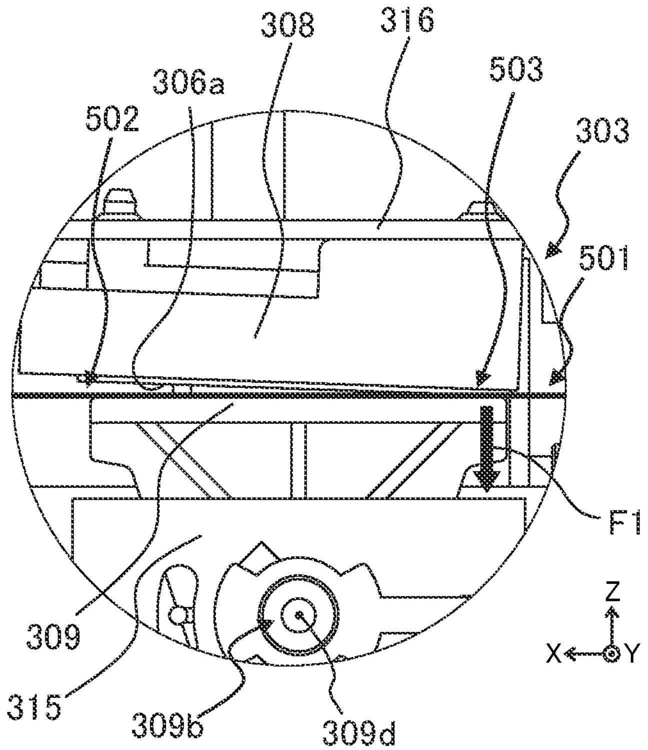
FIGS. 5A and 5B are each a diagram for describing the heat-and-press bonding portion according to the first embodiment.
Figure 5B:
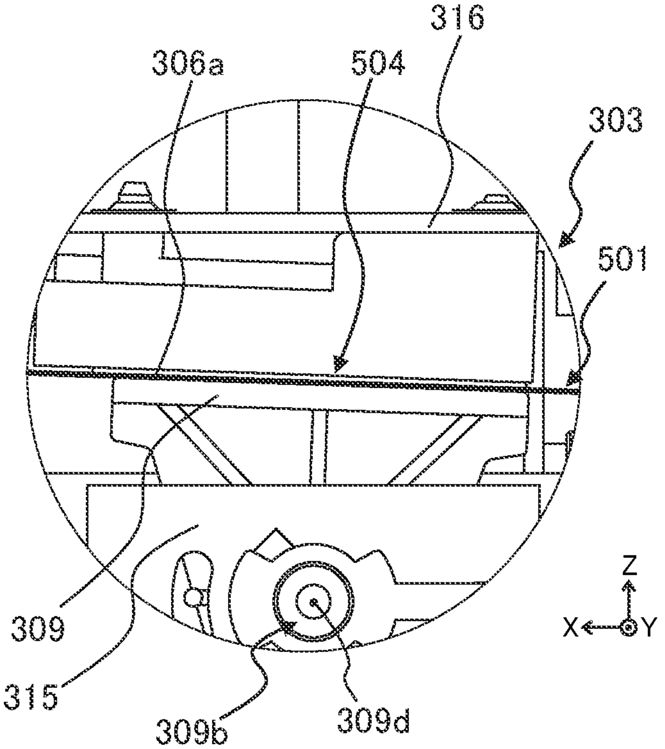

The inclination correction mechanism about the Y axis will be described with reference to FIGS. 5A and 5B. FIG. 5A is a diagram illustrating the pressure plate 306 and the receiving part 309 as viewed from the +Y side at the time when the pressure plate 306 is in contact with the sheet stack 501 in the heat-and-press bonding operation. FIG. 5B is a diagram illustrating the pressure plate 306 and the receiving part 309 as viewed from the +Y side when the pressure plate 306 is pressing the sheet stack 501 after the state of FIG. 5A. The sheet stack 501 is obtained by stacking and aligning a plurality of sheets serving as a target of heat-and-press bonding on the processing stage 160.

As illustrated in FIG. 5A, here, it is assumed that the contact surface 306*a* of the pressure plate 306 is inclined about the Y axis due to the manufacture tolerance of parts of the heater portion 303 or the like. That is, it is assumed that the actual contact surface 306*a* is rotated in the clockwise direction or the counterclockwise direction in FIG. 5A with respect to a surface (designed contact surface) orthogonal to the pressurizing direction (Z direction) as viewed in the Y direction.

In FIG. 5A, whereas one end portion 503 of the contact surface 306*a* is in contact with the sheet stack 501, the other end portion 502 of the contact surface 306*a* is not in contact with the sheet stack 501. If the heat-and-press bonding is performed in the example of FIG. 5A in the case where the receiving part 309 is fixed to the main chassis 330 of the heat-and-press bonding portion 153, while the contact pressure is concentrated on the one end portion 503 of the contact surface 306*a*, the contact pressure on the other end portion 502 becomes low, or the other end portion 502 remains out of contact. That is, the pressurizing force acting on the sheet stack per unit length in the X direction becomes uneven. As a result of this, there is a possibility that a bonding failure occurs.

Here, in the present embodiment, a configuration in which the receiving part 309 is capable of tilting about the axis 309*d* extending in the Y direction is employed. Therefore, when only the one end portion 503 of the contact surface 306*a* is in contact with the sheet stack 501 as illustrated in FIG. 5A, the receiving part 309 tilts in the clockwise direction in FIG. 5B by a force F1 that the receiving part 309 receives from the pressure plate 306 via the sheet stack 501 as illustrated in FIG. 5B. This tilting direction is such a direction that the contact surface 309*a* of the receiving part 309 becomes closer to parallel to the contact surface 306*a* of the pressure plate 306 as viewed in the Y direction.

As described above, even in the case where the contact surface 306*a* of the pressure plate 306 is inclined about the Y axis due to the manufacture tolerance or the like, the relative inclination between the pressure plate 306 and the receiving part 309 is absorbed by tilting of the contact surface 309*a* of the receiving part 309. As a result, the pressure plate 306 can approximately evenly press the sheet stack 501 in the entirety of a region 504 where the contact surface 306*a* of the pressure plate 306 and the contact surface 309*a* of the receiving part 309 oppose each other. That is, the pressurizing force acting on the sheet stack per unit length in the X direction is equalized, and the possibility of occurrence of a bonding failure is reduced.

That is, in the present embodiment, the inclination correction mechanism about the Y axis is constituted by support elements (shaft portions 309*b* and 309*c*, bearings 310*a* and 310*b*, support portion 330*a*, and support metal plate 315) that enable the receiving part 309 to tilt. These support elements are examples of a support means or support mechanism (first support means or first support mechanism) that supports the receiving member such that the receiving member is capable of tilting about an axis extending in a first direction intersecting with the pressurizing direction of the pressurizing member. The axis extending in the first direction in the present embodiment is the axis 309*d* of the receiving part 309, which is an axis extending in a direction orthogonal to the pressurizing direction (Z direction). To be noted, the first direction is preferably a direction orthogonal to the pressurizing direction, but may be a direction obliquely intersecting with the pressurizing direction.

To be noted, although a case where the contact surface 306*a* of the pressure plate 306 is inclined about the Y axis has been described herein, the inclination correction mechanism about the Y axis is also effective in the case where the contact surface 309*a* of the receiving part 309 is inclined due to the manufacture tolerance or the like. Specifically, it is assumed that the contact surface 309*a* is inclined about the Y axis with respect to a plane orthogonal to the pressurizing direction (Z direction) due to the part tolerance of the receiving part 309 or the like in a state in which the receiving part 309 is held at the neutral position by the urging force of the tension spring 311 as illustrated in FIG. 4A. Also in this case, the receiving part 309 can tilt so as to absorb the relative inclination between the contact surfaces 306*a* and 309*a* by the force that the receiving part 309 receives from the pressure plate 306 via the sheet stack at the time of heat-and-press bonding.

Inclination Correction Mechanism about X Axis

Figure 6:
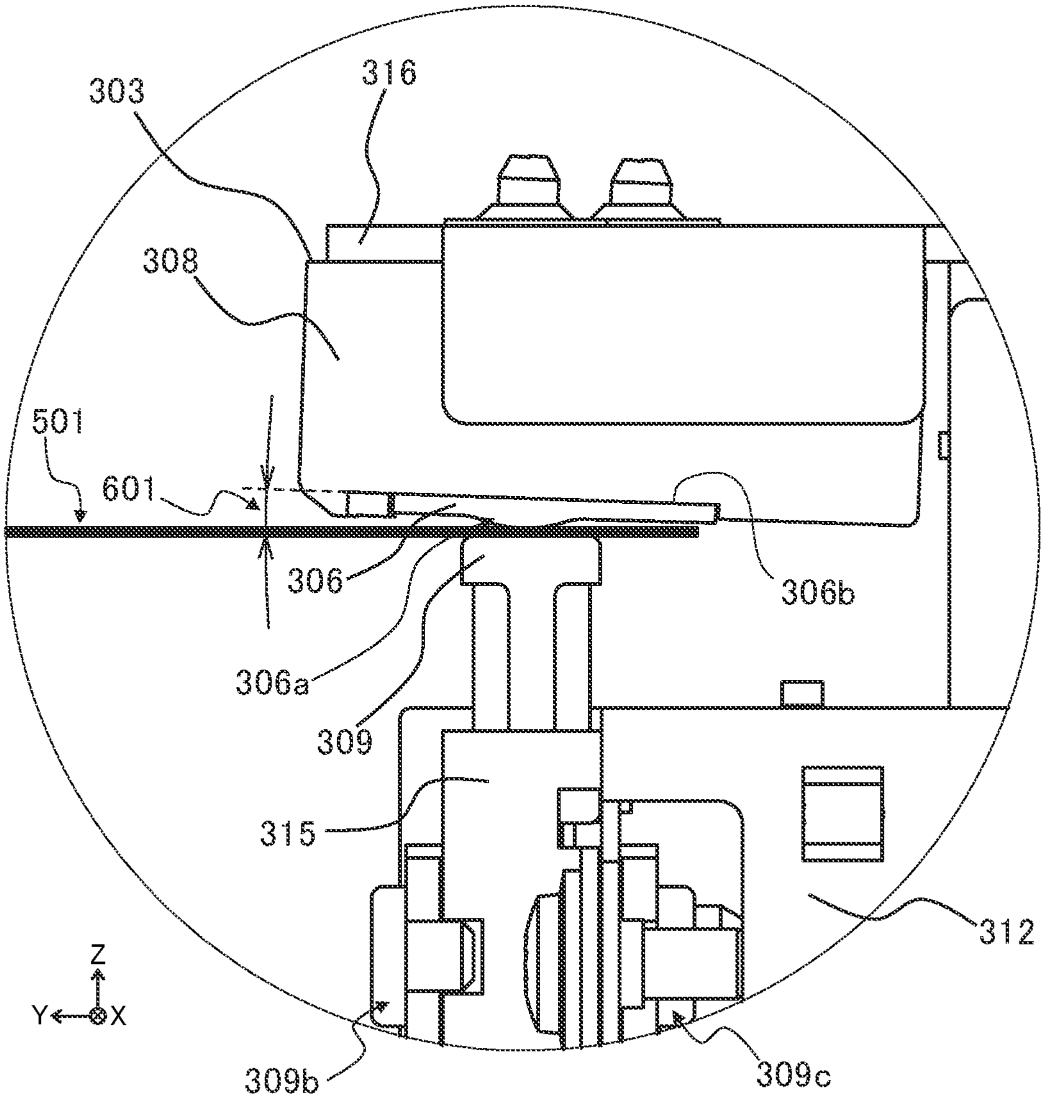
FIG. 6 is a diagram for describing the heat-and-press bonding portion according to the first embodiment.

The inclination correction mechanism about the X axis will be described with reference to FIG. 6. FIG. 6 is a diagram illustrating the pressure plate 306 and the receiving part 309 as viewed from the –X side when the pressure plate 306 is pressing the sheet stack 501.

Here, it is assumed that the pressure plate 306 is inclined about the X axis due to the manufacture tolerance of the heater portion 303 or the like. Specifically, it is assumed that a main surface 306*b* (surface that comes into contact with the heater 304) of the pressure plate 306 on the side opposite to the contact surface 306*a* is inclined by a non-zero angle 601 with respect to a plane orthogonal to the pressurizing direction (Z direction) as viewed in the X direction.

If the contact surface 306*a* is a flat surface, the end portion of the contact surface 306*a* on the right side is more strongly in contact with the sheet stack 501 than the end portion thereof on the left side in the state of FIG. 6. That is, the pressurizing force acting on the sheet stack per unit length in the Y direction becomes uneven. As a result, there is a possibility that a bonding failure occurs.

In the present embodiment, a ridge portion (projection portion) extending in the X direction and having a sectional shape projecting toward the receiving part 309 (–Z side) in the pressurizing direction as viewed in the X direction is provided on the contact surface 306*a* of the pressure plate 306. Therefore, the pressure plate 306 comes into contact with the sheet stack 501 at the ridge line portion of the ridge portion. In other words, the pressure plate 306 is in a so-called line contact state in which the pressure plate 306 is in contact with the sheet stack in a linear region extending in the X direction.

In the case where the pressure plate 306 is inclined about the X axis, just the contact position between the contact surface 306*a* and the sheet stack 501 is displaced in the Y direction, and the line contact state is maintained.

As described above, as a result of the contact surface 306*a* being configured to come into line contact with the sheet stack 501, the relative inclination between the pressure plate 306 and the receiving part 309 is absorbed even in the case where the contact surface 306*a* of the pressure plate 306 is inclined about the X axis due to the manufacture tolerance or the like. That is, even in the case where the pressure plate 306 is inclined about the X axis, change in the contact area between the pressure plate 306 and the sheet stack 501 can be suppressed. Therefore, unevenness of the pressurizing force acting on the sheet stack 501 per unit length in the Y direction can be avoided. In other words, the distribution of the pressurizing force acting on the sheet stack 501 can be maintained approximately uniform in the Y direction regardless of the inclination of the pressure plate 306 about the X axis, and thus the possibility of occurrence of a bonding failure can be reduced.

To be noted, although a case where the pressure plate 306 is inclined about the X axis has been described herein, the inclination correction mechanism about the X axis is also effective in the case where the contact surface 309*a* of the receiving part 309 is inclined. Specifically, it is assumed that the contact surface 309*a* is not orthogonal to the pressurizing direction (Z direction) and is inclined up rightward or down rightward in FIG. 6 as viewed from the viewpoint of FIG. 6 due to the manufacture tolerance of the receiving part 309 or the like. Also in this case, the ridge portion of the contact surface 306*a* of the pressure plate 306 comes into line contact with the sheet stack 501, and therefore the inclination of the contact surface 309*a* about the X axis is absorbed.

In the present embodiment, the inclination correction mechanism about the X axis is constituted by a ridge portion of the contact surface 306*a* that enables the pressure plate 306 to come into line contact with the sheet stack 501. The ridge portion of the contact surface 306*a* is an example of a ridge portion having a sectional shape projecting toward the receiving member in the pressurizing direction and extending in a direction intersecting with the pressurizing direction.

In addition, the ridge portion of the contact surface 306*a* is an example of a ridge portion having a sectional shape projecting toward the receiving member in the pressurizing direction and extending in a second direction intersecting with both the pressurizing direction and the first direction. That is, in the present embodiment, a first support means (first support mechanism) that allows the receiving member to tilt about the axis extending in the first direction and a ridge portion (projection portion) that absorbs the inclination of the pressurizing member or the receiving member about the axis extending in the second direction are used in combination. As a result of this, arbitrary relative inclination between the pressurizing member and the receiving member can be absorbed.

The second direction of the present embodiment is the X direction orthogonal to the pressurizing direction (Z direction). To be noted, the second direction is preferably a direction orthogonal to the pressurizing direction, but may be a direction obliquely intersecting with the pressurizing direction. In addition, the second direction is preferably orthogonal to both the pressurizing direction and the first direction, but may be a direction obliquely intersecting with each of the pressurizing direction and the first direction.

In addition, the ridge portion (projection portion) of the contact surface 306*a* may have a sectional shape different from an arcuate shape as long as the ridge portion enables the pressurizing member to come into contact with the sheet stack in a linear region along the second axis. As the ridge portion, one having a sectional shape projecting toward the receiving part 309 (−Z side) in a cross-section orthogonal to the X direction and extending in the X direction can be used. For example, the ridge portion may be formed to have an inverted triangular cross-section (isosceles triangle having the bottom on the +Z side and the apex on the −Z side) and extend in the X direction. In addition, to reduce a pressure trace on the sheet surface, a ridge portion having a curved sectional shape (for example, a parabolic sectional shape) that is smoothly curved in a cross-section orthogonal to the X direction is preferably used.

Incidentally, a ridge portion (projection portion) having an arcuate cross-section also has the following advantages. In the present embodiment, the heater portion 303 is held by the lifting/lowering stay 316, and warpage of the lifting/lowering stay 316 (or the heater base 308) during heat-and-press bonding can also cause the inclination of the pressure plate 306. Here, in the case where a ridge portion having an arcuate cross-section is provided on the contact surface 306*a*, the contact position is displaced in the Y direction in accordance with the increase in the pressurizing force during heat-and-press bonding while the line contact state between the contact surface 306*a* and the sheet stack 501 is maintained. Specifically, if the pressurizing force is increased from the state of FIG. 6, the warpage of the lifting/lowering stay 316 increases, thus the pressure plate 306 slightly tilts in the clockwise direction in FIG. 6, and the contact position between the contact surface 306*a* and the sheet stack 501 shifts to the right side in FIG. 6. As a result of this, an advantage that heat-and-press bonding can be performed in a region having a width in a direction (Y direction) orthogonal to the longitudinal direction (X direction) of the line contact while the pressure plate 306 is configured to be in line contact with the sheet stack 501 can be obtained.

Case of Inclination about Both Y Axis and X Axis

In the description above, the effects of the inclination correction mechanism about the Y axis and the inclination correction mechanism about the X axis in the case where the pressure plate 306 or the receiving part 309 is inclined about the Y axis or the X axis have been separately described. In the actual apparatus, there is a possibility that the relative inclination between the pressure plate 306 and the receiving part 309 occurs about an axis in a direction obliquely intersecting with the X axis and the Y axis.

However, the inclination correction mechanism about the Y axis and the inclination correction mechanism about the X axis can function simultaneously. Therefore, even in the case where the relative inclination between the pressure plate 306 and the receiving part 309 is inclination about an axis in a direction obliquely intersecting with the X axis and the Y axis, according to the configuration of the present embodiment, such oblique inclination can be absorbed, and thus the possibility of occurrence of a bonding failure can be reduced. In this case, when the oblique inclination is divided into an inclination component about the Y axis and an inclination component about the X axis, the inclination correction mechanism about the Y axis corrects the inclination component about the Y axis, and the inclination correction mechanism about the X axis corrects the inclination component about the X axis.

MODIFICATION EXAMPLE

In the present embodiment, a sheet bonding apparatus including both the inclination correction mechanism about the Y axis (first support means or first support mechanism) and the inclination correction mechanism about the X axis (ridge portion) has been described. The configuration is not limited to this, and a sheet bonding apparatus including only one of the inclination correction mechanism about the Y axis (first support means or first support mechanism) or the inclination correction mechanism about the X axis (ridge portion) may be used. Also in this case, the inclination about the Y axis or the inclination about the X axis extending in the pressurizing member and the receiving member can be absorbed.

Second Embodiment

The configuration of a heat-and-press bonding portion 153A according to a second embodiment will be described with reference to FIGS. 7A to 7C. The heat-and-press bonding portion 153A can be provided as part of the sheet processing apparatus 150 similarly to the heat-and-press bonding portion 153 of the first embodiment. In the description below, it is assumed that elements denoted by the same reference signs as in the first embodiment have substantially the same configurations and effects as those described in the first embodiment unless described otherwise, and part different from the first embodiment will be mainly described.

Figure 7A:
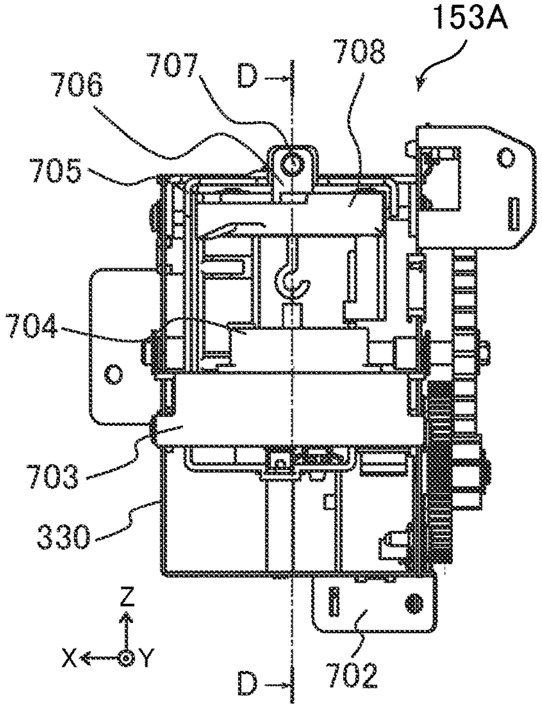
FIGS. 7A to 7D are each a diagram for describing a heat-and-press bonding portion according to a second embodiment.
Figure 7B:
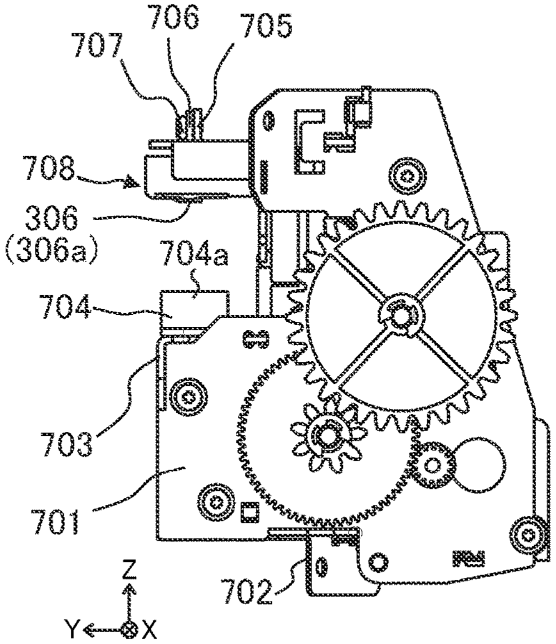
Figure 7C:
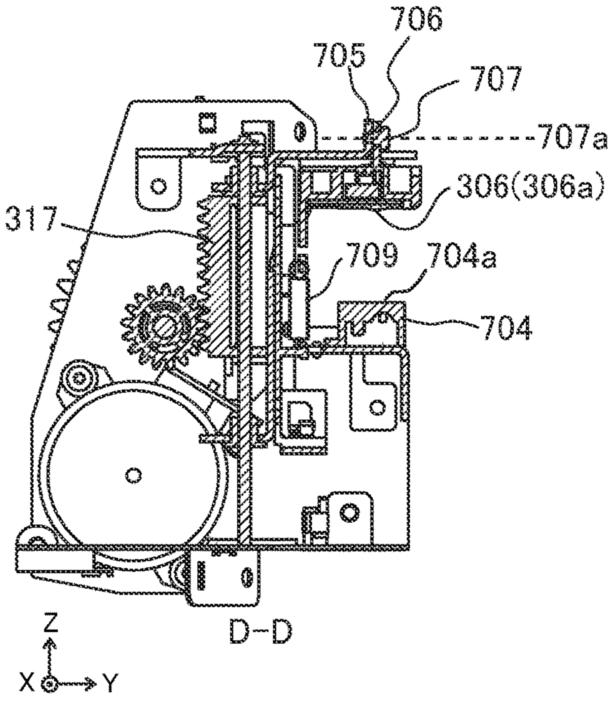

As illustrated in FIGS. 7A to 7C, the heat-and-press bonding portion 153A includes a heater portion 708 and a receiving part 704. The heater portion 708 includes a heater base 706. The heater base 706 is, via a pin 707, coupled to a lifting/lowering stay 705 that is a metal plate member fastened to the rack gear 317. For example, as the pin 707, a stepped pin having a sectional shape illustrated in FIG. 7C, penetrating a hole portion provided in the heater base 706 in the Y direction, and swaged into a hole portion provided in the lifting/lowering stay 705 can be used. The pin 707 is an example of a shaft portion (second shaft portion) extending in the first direction and enabling the pressurizing member to tilt thereabout. As a result of this, the heater portion 708 is capable of tilting about an axis 707*a* (first axis) of the Y direction.

A tension spring 709 is disposed between the heater base 706 of the heater portion 708 and a main chassis of the heat-and-press bonding portion 153A in a stretched and connected state. The heater portion 708 is urged toward the neutral position (standard position) by the urging force of the tension spring 709. The heater portion 708 is configured such that the pressure plate 306 takes an orientation orthogonal to the pressurizing direction (Z direction) at the neutral position. The tension spring 709 is an example of an urging means or urging member (second urging means or second urging member) that urges the pressurizing member to maintain the orientation of the pressurizing member in a state before the sheet stack is received in the space between the pressurizing member and the receiving member. As a result of this, the possibility of the sheet stack getting caught when being delivered into the heat-and-press bonding portion 153A can be reduced.

The receiving part 704 has a contact surface 704*a* that comes into contact with the sheet stack. The heat-and-press bonding portion 153A performs heat-and-press bonding by nipping the sheet stack between the receiving part 704 and the pressure plate 306 and thus heating and pressurizing the sheet stack. Similarly to the first embodiment, a ridge portion (projection portion) having a sectional shape projecting in the pressurizing direction and extending in a direction (X direction) intersecting with the pressurizing direction is provided on the contact surface 306*a* of the pressure plate 306.

The receiving part 704 is positioned and fastened to a support metal plate 703 serving as part of the main chassis 330. As a result of this, the receiving part 704 is fixed to the frame body of the heat-and-press bonding portion 153A.

In the present embodiment, the heater portion 708 tilts about the Y axis during heat-and-press bonding, and thus the relative inclination about the Y axis between the pressure plate 306 and the receiving part 704 can be absorbed. Support elements (pin 707, heater base 706, and lifting/lowering stay 705) that enable the pressure plate 306 to tilt are examples of a support means or support mechanism (second support means or second support mechanism) that supports the pressurizing member such that the pressurizing member is capable of tilting about an axis extending in a first direction intersecting with the pressurizing direction.

In addition, since the pressure plate 306 includes the ridge portion extending in the X direction similarly to the first embodiment, the pressure plate 306 comes into line contact with the sheet stack during heat-and-press bonding, and thus the relative inclination about the X axis between the pressure plate 306 and the receiving part 704 can be absorbed. The ridge portion of the pressure plate 306 is an example of a ridge portion having a sectional shape projecting toward the receiving member in the pressurizing direction and extending in a second direction intersecting with both the pressurizing direction and the first direction.

As described above, the inclination correction mechanism about the Y axis enabling the heater portion 708 to tilt and the ridge portion (projection portion) enabling the line contact of the pressure plate 306 constitute an equalizing means (inclination correction mechanism or pressure equalizing mechanism) of the present embodiment. Also according to the configuration of the present embodiment, the sheets can be bonded more stably.

MODIFICATION EXAMPLE

Figure 7D:
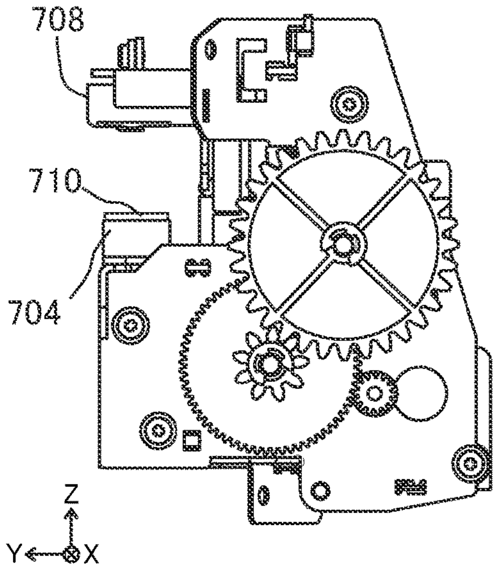

As illustrated in FIG. 7D, a silicone rubber 710 serving as an elastic member formed from an elastic material (elastomer) may be disposed on the receiving part 704 to constitute the contact surface with the sheet stack by the elastic member. As a result of this, minute undulation (unevenness) of the surface of the receiving part 704 causing the distribution of the pressurizing force on the sheet stack to be non-uniform can be suppressed, and thus the sheets can be bonded together more stably.

Third Embodiment

The configuration of a heat-and-press bonding portion 153B according to a third embodiment will be described with reference to FIGS. 8A to 8G. The heat-and-press bonding portion 153B can be provided as part of the sheet processing apparatus 150 similarly to the heat-and-press bonding portion 153 of the first embodiment. In the description below, it is assumed that elements denoted by the same reference signs as in the first embodiment have substantially the same configurations and effects as those described in the first embodiment unless described otherwise, and part different from the first embodiment will be mainly described.

Figure 8A:
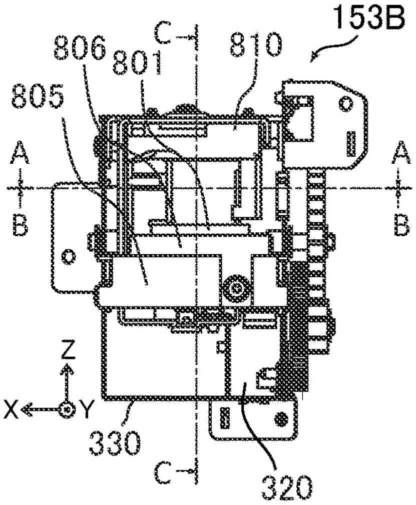
FIGS. 8A to 8G are each a diagram for describing a heat-and-press bonding portion according to a third embodiment.
Figure 8B:
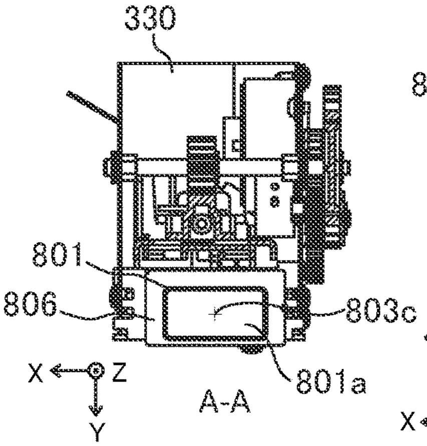
Figure 8C:
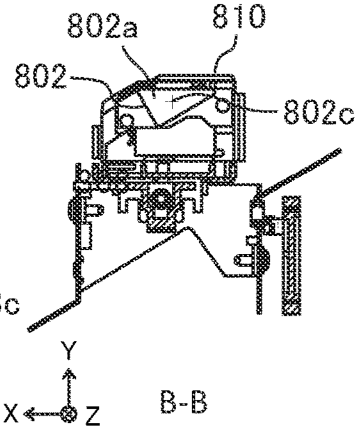
Figure 8D:
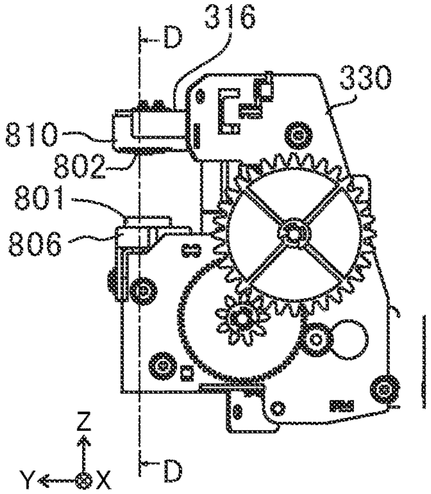
Figure 8E:
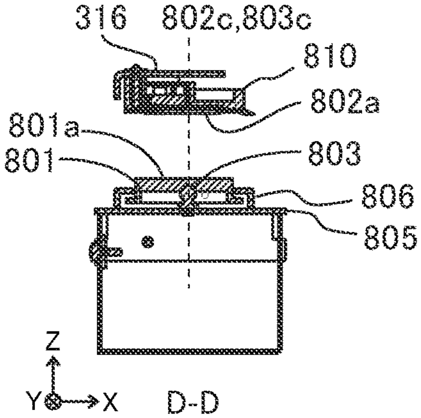
Figure 8F:
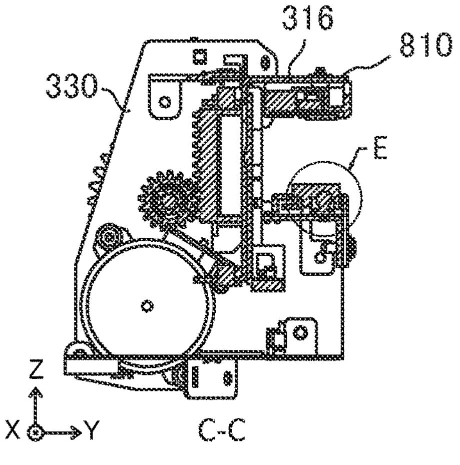
Figure 8G:
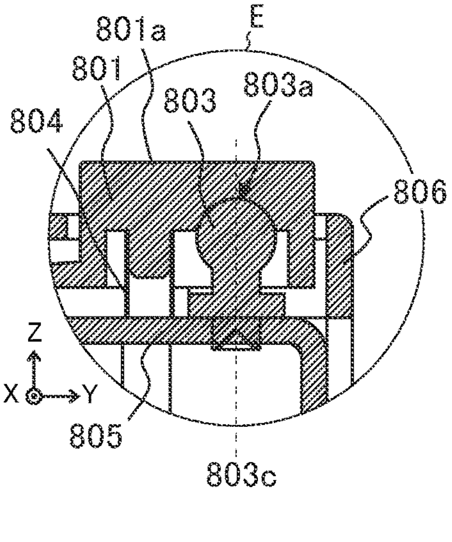

FIG. 8A is a diagram illustrating the heat-and-press bonding portion 153B as viewed from the +Y side. FIG. 8B is a section view of the heat-and-press bonding portion 153B taken along a line A-A of FIG. 8A. FIG. 8C is a section view of the heat-and-press bonding portion 153B taken along a line B-B of FIG. 8A. FIG. 8D is a diagram illustrating the heat-and-press bonding portion 153B as viewed from the −X side. FIG. 8E is a section view of the heat-and-press bonding portion 153B taken along a line D-D of FIG. 8D. FIG. 8F is a section view of the heat-and-press bonding portion 153B taken along a line C-C of FIG. 8A. FIG. 8G is an enlarged view of a region E of FIG. 8F.

As illustrated in FIG. 8A, the heat-and-press bonding portion 153B includes the main chassis 330, a heater portion 810, a receiving part 801, and a driving system including the motor 320. The receiving part 801 is disposed to be exposed through an opening of a metal plate part 806. The metal plate part 806 is fastened to a metal plate part 805 of the main chassis 330. As illustrated in FIG. 8B, the receiving part 801 has a contact surface 801*a* that comes into contact with the sheet stack.

As illustrated in FIG. 8C, the heater portion 810 includes a pressure plate 802 serving as a pressurizing member. The pressure plate 802 is, via a heater base or the like, fastened to the lifting/lowering stay 316 lifted and lowered by the driving system as illustrated in FIG. 8F. The pressure plate 802 has a contact surface 802*a* that comes into contact with the sheet stack. In addition, a centroid 802*c* of the contact surface 802*a* as viewed in the pressurizing direction (Z direction) is illustrated. The contact surface 802*a* of the pressure plate 802 of the present embodiment has a right triangle shape, and is disposed such that a right angle portion thereof opposes a corner portion (upper-right corner of FIGS. 2A and 2B) of the sheet stack during heat-and-press bonding.

The mechanism of lifting and lowering the heater portion 810 is substantially the same as in the first embodiment. The heat-and-press bonding portion 153B nips the sheet stack between the contact surface 802*a* of the pressure plate 802 and the contact surface 801*a* of the receiving part 801 to heat and pressurize the sheet stack, and thus performs heat-and-press bonding of the sheet stack.

As illustrated in FIGS. 8D and 8E, the receiving part 801 is supported by the main chassis 330 (metal plate part 805) via a support part 803. The support part 803 is fixed to the main chassis 330 by being swaged to the metal plate part 805.

As illustrated in FIGS. 8E and 8G, the support part 803 includes a support portion 803*a* that supports the receiving part 801 to be capable of tilting. The support portion 803*a* is formed to have a projecting shape projecting to the +Z side as viewed in the X direction and the Y direction. The receiving part 801 is supported by the support portion 803*a* from the −Z side.

The support portion 803*a* of the present embodiment is formed in an approximate sphere shape (spherical surface shape). Therefore, the receiving part 801 is capable of tilting about the X axis and the Y axis by using the contact portion with the support portion 803*a* as a fulcrum. That is, the receiving part 801 of the present embodiment is capable of tilting with respect to a plane orthogonal to the pressurizing direction (Z direction) so as to absorb the relative inclination between the pressure plate 802 and the receiving part 801 in an arbitrary direction. The support part 803 is an example of a third support means or third support mechanism that supports one of the pressurizing member or the receiving member such that the one of the pressurizing member or the receiving member is capable of tilting about an axis extending in the first direction intersecting with the pressurizing direction of the pressurizing member, and that supports the other of the pressurizing member or the receiving member such that the other of the pressurizing member or the receiving member is capable of tilting about an axis extending in the second direction intersecting with both the pressurizing direction and the first direction.

To be noted, the shape of the support portion 803*a* is not limited to a sphere shape, and may be, for example, an elliptical shape as long as the support portion 803*a* is capable of supporting the receiving part 801 such that the receiving part 801 is capable of tilting about the X axis and the Y axis. It suffices as long as the support portion 803*a* has a sectional shape projecting toward the pressurizing member in the pressurizing direction in each of a cross-section orthogonal to the first direction and a cross-section orthogonal to the second direction and is configured such that the receiving part 801 tilts by using a contact portion with the support portion 803*a* as a fulcrum. To be noted, the support portion 803*a* preferably has a sectional shape that is a smooth curve projecting to the +Z side in a cross-section orthogonal to the X direction and a cross-section orthogonal to the Y direction such that the receiving part 801 smoothly tilts.

When viewed in the Z direction, a center 803*c* of the support portion 803*a* as viewed in the Z direction illustrated in FIG. 8B is preferably positioned within a range of the contact surface 802*a* of the pressure plate 802 as viewed in the Z direction. In addition, the centroid 802*c* of the contact surface 802*a* of the pressure plate 802 as viewed in the Z direction illustrated in FIG. 8C preferably overlaps with the support portion 803*a* as viewed in the Z direction. More preferably, as illustrated in FIGS. 8E and 8F, the support portion 803*a* and the pressure plate 802 are arranged such that the center 803*c* of the support portion 803*a* as viewed in the Z direction substantially coincides with the centroid 802*c* of the contact surface 802*a* of the pressure plate 802. As a result of this, the receiving part 801 becomes more likely to tilt so as to absorb the inclination between the receiving part 801 and the pressure plate 306.

As illustrated in FIG. 8G, the receiving part 801 is urged by a compression spring 804 serving as an urging means or urging member. Specifically, the center of gravity of the receiving part 801 is positioned on the −Y side with respect to the center 803*c* of the support portion 803*a*. By urging the receiving part 801 to the +Z side by the compression spring 804 disposed on the −Y side with respect to the center 803*c*, a force for the receiving part 801 to take an orientation in which the +Y side of the contact surface 801*a* is lowered to the −Z side and the −Y side of the contact surface 801*a* is lifted to the +Z side acts.

That is, a configuration in which the receiving part 801 takes such an orientation that the contact surface 801*a* of the receiving part 801 is lower on the side (+Y side) on which the space between the pressure plate 802 and the receiving part 801 is open for receiving the sheet stack is employed. Therefore, occurrence of the upward step from the processing stage 160 to the receiving part 801 can be reduced, and the possibility that the sheet stack gets caught when being delivered to the heat-and-press bonding portion 153B can be reduced.

In the present embodiment, the relative inclination between the pressure plate 802 and the receiving part 801 can be absorbed by the receiving part 801 tilting about the X axis and/or the Y axis during heat-and-press bonding. In other words, the inclination correction mechanism (support portion 803*a*) that enables the receiving part 801 to tilt constitutes the equalizing means (inclination correction mechanism or pressure equalizing mechanism) of the present embodiment.

Therefore, also according to the configuration of the present embodiment, the sheets can be bonded together more stably.

MODIFICATION EXAMPLE

In the third embodiment, a configuration in which the pressure plate 802 does not tilt during heat-and-press bonding and the receiving part 801 tilts in accordance with the pressurizing force has been described. Instead of this configuration, a configuration in which part of the heater portion 810 including the pressure plate 802 or the entirety of the heater portion 810 is supported to be tiltable about the X axis and the Y axis by a support element similar to the support portion 803*a* may be employed. In this case, the receiving part 801 can be configured as a member fixed to the main chassis 330. Also in this configuration, the relative inclination between the pressure plate 802 and the receiving part 801 can be absorbed by the pressure plate 802 tilting about the X axis and/or the Y axis during heat-and-press bonding, and thus the sheets can be bonded together more stably.

Fourth Embodiment

The configuration of a heat-and-press bonding portion 153C according to a fourth embodiment will be described with reference to FIGS. 9A to 9G. The heat-and-press bonding portion 153C can be provided as part of the sheet processing apparatus 150 similarly to the heat-and-press bonding portion 153 of the first embodiment. In the description below, it is assumed that elements denoted by the same reference signs as in the first embodiment have substantially the same configurations and effects as those described in the first embodiment unless described otherwise, and part different from the first embodiment will be mainly described.

Figure 9A:
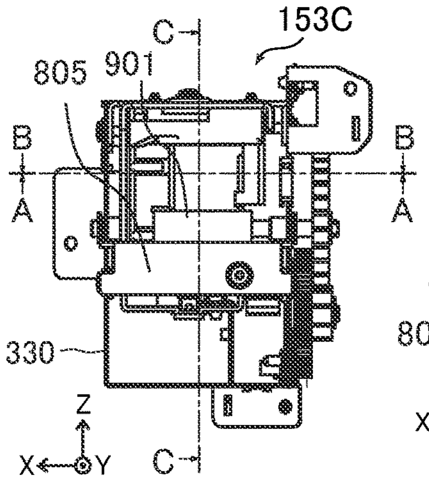
FIGS. 9A to 9G are each a diagram for describing a heat-and-press bonding portion according to a fourth embodiment.
Figure 9B:
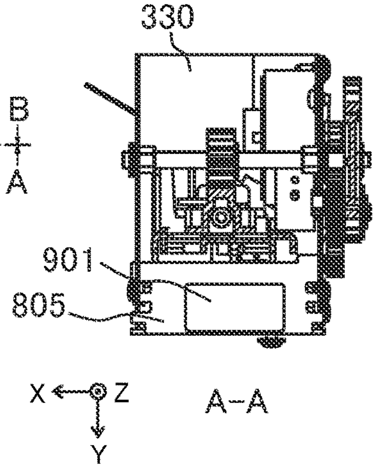
Figure 9C:
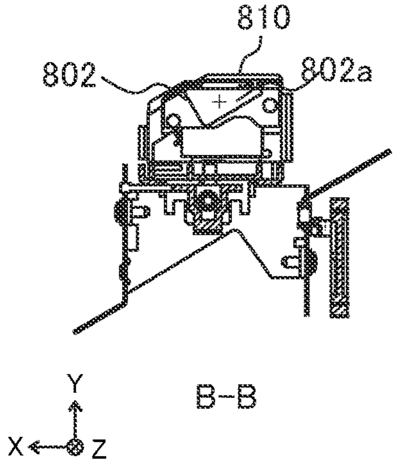
Figure 9D:
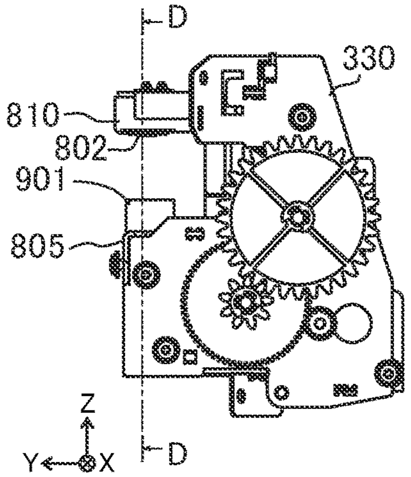
Figure 9E:
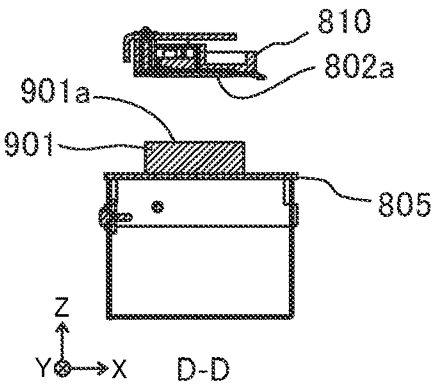
Figure 9F:
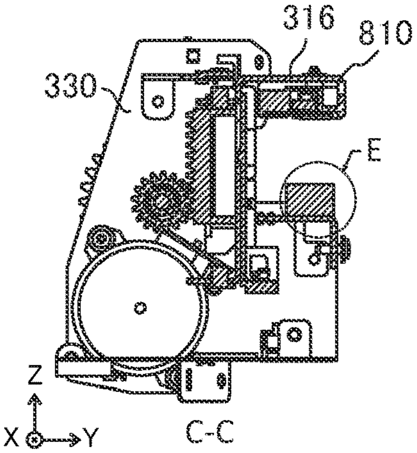
Figure 9G:
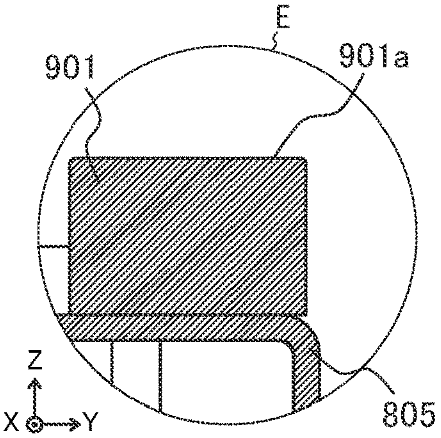

FIG. 9A is a diagram illustrating the heat-and-press bonding portion 153C as viewed from the +Y side. FIG. 9B is a section view of the heat-and-press bonding portion 153C taken along a line A-A of FIG. 9A. FIG. 9C is a section view of the heat-and-press bonding portion 153C taken along a line B-B of FIG. 9A. FIG. 9D is a diagram illustrating the heat-and-press bonding portion 153C as viewed from the −X side. FIG. 9E is a section view of the heat-and-press bonding portion 153C taken along a line D-D of FIG. 9D. FIG. 9F is a section view of the heat-and-press bonding portion 153C taken along a line C-C of FIG. 9A. FIG. 9G is an enlarged view of a region E of FIG. 9F.

In the present embodiment, the receiving part 801 of the third embodiment is replaced by a receiving part 901 serving as an elastic member formed from an elastic material (elastomer). In addition, the support part 803 of the third embodiment is not provided.

As illustrated in FIGS. 9A to 9G, the heat-and-press bonding portion 153C includes the heater portion 810 including the pressure plate 802, and the receiving part 901, and performs heat-and-press bonding by nipping the sheet stack between the pressure plate 802 and the receiving part 901 and thus heating and pressurizing the sheet stack.

The receiving part 901 is, for example, a plate-like part formed from silicone rubber. The receiving part 901 is bonded to the metal plate part 805 of the main chassis 330 by using an adhesive. The receiving part 901 has a contact surface 901*a* that comes into contact with the sheet stack.

In the heat-and-press bonding, the receiving part 901 is elastically deformed by the pressurizing force received from the pressure plate 802 via the sheet stack. As a result of this, for example, the contact surface 901*a* can tilt (deform) so as to absorb the inclination of the pressure plate 802 even in the case where the pressure plate 802 is inclined due to the manufacture tolerance or the like.

In the case where the hardness of the receiving part 901 is lower, it is easier to absorb the inclination of the pressure plate 802 about the X axis and the Y axis. However, in the case where the hardness of the receiving part 901 is too low, that is, in the case where the receiving part 901 is too soft, there is a possibility that the sheet stack is wrinkled after the heat-and-press bonding. Conversely, in the case where the hardness of the receiving part 901 is high, the sheet stack is less likely to be wrinkled, but it is desired that the pressurizing force in the heat-and-press bonding is sufficiently high to absorb the inclination of the pressure plate 802. Therefore, it is preferable that the output and intensity of the driving system that drives the heater portion 810 are set in accordance with the hardness of the receiving part 901. For example, for the receiving part 901, silicone rubber having a JIS-A hardness of 50° or more and 80° or less can be used In a test apparatus to which the present embodiment was applied, as a result of adjusting the output of the driving system and the like, it was confirmed that the inclination could be absorbed in the case where the parallelism of the contact surface 802*a* of the pressure plate 802 and the contact surface 901*a* of the receiving part 901 was within a range of about 1/10 mm or less. To be noted, the inclination of the contact surfaces 802*a* and 901*a* may be about either of the X axis and the Y axis, and may include components of both.

In the present embodiment, the receiving part 901 is elastically deformed during the heat-and-press bonding, and thus the relative inclination between the pressure plate 802 and the receiving part 801 can be absorbed. In other words, the receiving part 901 itself having a contact surface that comes into contact with the sheet stack and is formed from an elastic material constitutes the equalizing means (inclination correction mechanism or pressure equalizing mechanism) of the present embodiment.

Therefore, also according to the configuration of the present embodiment, the sheets can be more stably bonded together.

First Modification Example

In the fourth embodiment, a configuration in which the heater portion 810 does not include an elastic member, and the receiving part 901 elastically deforms in accordance with the pressurizing force during the heat-and-press bonding has been described. Instead of this configuration, a configuration in which an elastic member is provided on the pressurizing member side and the pressurizing member deforms or tilts in accordance with the pressurizing force during the heat-and-press bonding may be employed. For example, an elastic member such as silicone rubber may be interposed between the lining/lowering stay 316 and the heater base 308 illustrated in FIG. 9E. In addition, part or entirety of the pressure plate 802 may be formed from an elastic material. In this case, the receiving part 901 can be formed as a rigid member that does not substantially deform even when receiving the pressurizing force during the heat-and-press bonding. Also according to this configuration, since the pressure plate 802 deforms or tilts in accordance with the pressurizing force during heat-and-press bonding, the relative inclination between the pressure plate 802 and the receiving part 901 can be absorbed, and thus the sheets can be more stably bonded together. To be noted, the heater portion 810 provided with an elastic member and the receiving part 901 of the fourth embodiment formed from an elastic material may be used in combination.

Second Modification Example

In the fourth embodiment, a configuration in which the receiving part 901 itself is an elastic member formed from an elastic material has been described. Instead of this, for example, a configuration in which the receiving part 901 itself is formed as a rigid member that substantially does not deform by the pressurizing force during heat-and-press bonding and an elastic member is interposed between the receiving part 901 and the metal plate part 805 may be employed. Also according to this configuration, the inclination of the pressure plate 802 can be absorbed by elastic deformation of the elastic member.

Fifth Embodiment

The configuration of a heat-and-press bonding portion 153D according to a fifth embodiment will be described with reference to FIGS. 10A to 10C. The heat-and-press bonding portion 153D can be provided as part of the sheet processing apparatus 150 similarly to the heat-and-press bonding portion 153 of the first embodiment. In the description below, it is assumed that elements denoted by the same reference signs as in the first embodiment have substantially the same configurations and effects as those described in the first embodiment unless described otherwise, and part different from the first embodiment will be mainly described.

Figure 10A:
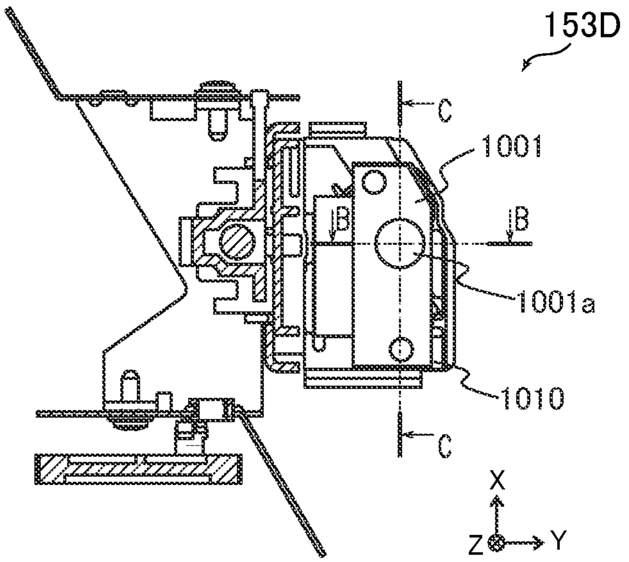
FIGS. 10A to 10C are each a diagram for describing a heat-and-press bonding portion according to a fifth embodiment.

FIG. 10A is a diagram illustrating the heat-and-press bonding portion 153D as viewed from the +Z side. FIG. 10B is a section view of the heat-and-press bonding portion 153D taken along a line B-B of FIG. 10A. FIG. 10C is a section view of the heat-and-press bonding portion 153D taken along a line C-C of FIG. 10A.

Figure 10B:
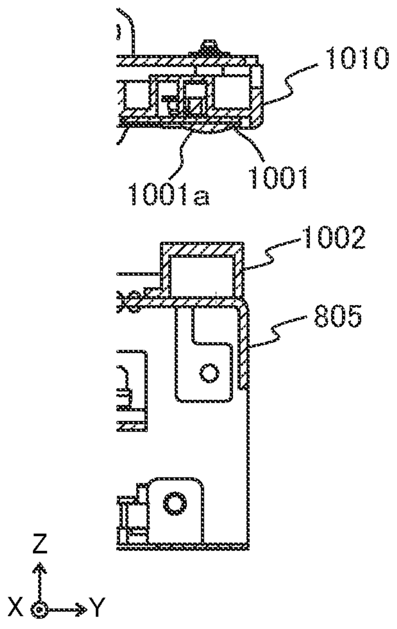
Figure 10C:
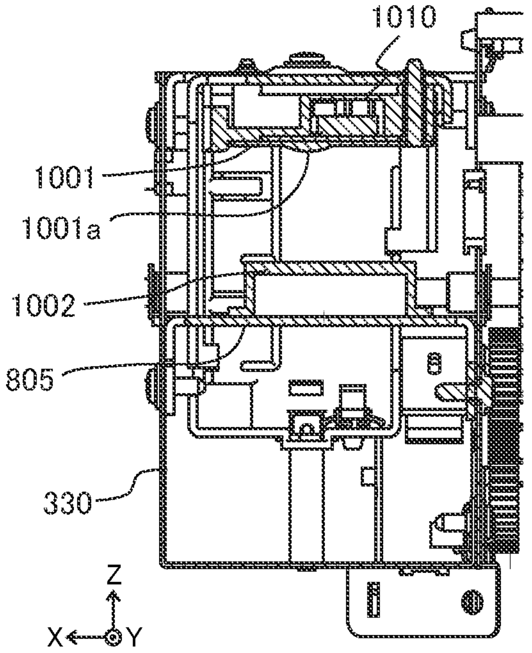

As illustrated in FIGS. 10A to 10C, the heat-and-press bonding portion 153D includes a heater portion 1010 including a pressure plate 1001, and a receiving part 1002, and performs heat-and-press bonding by nipping the sheet stack between the pressure plate 1001 and the receiving part 1002 and thus heating and pressurizing the sheet stack.

The receiving part 1002 is fastened to the metal plate part 805 of the main chassis 330, and is thus fixed to the main chassis 330. In addition, the receiving part 1002 can be formed as a rigid member that substantially does not deform during heat-and-press bonding instead of an elastic member like the receiving part 901 of the fourth embodiment. However, the receiving part 1002 may be formed from an elastic material.

As illustrated in FIGS. 10B and 10C, the pressure plate 1001 has a contact surface 1001*a* that comes into contact with the sheet stack. At least part of the contact surface 1001*a* is formed as a spherical surface projecting in the pressurizing direction (−Z side). Therefore, when the heat-and-press bonding portion 153D nips the sheet stack between the pressure plate 1001 and the receiving part 1002, the pressure plate 1001 substantially comes into point contact with the sheet stack at the vicinity of an apex of the contact surface 1001*a*.

Therefore, even in the case where the pressure plate 1001 and the receiving part 1002 are relatively inclined due to manufacture tolerance or the like, the pressure plate 1001 comes into point contact with the sheet stack, and thus the inclination between the pressure plate 1001 and the receiving part 1002 is absorbed. To be noted, the relative inclination between the pressure plate 1001 and the receiving part 1002 may be inclination about the X axis, inclination about the Y axis, or a combination of these.

To be noted, the projection shape of the contact surface 1001*a* of the pressure plate 1001 is not limited to a spherical shape as long as the contact surface 1001*a* comes into substantially point contact with the sheet stack, and may be, for example, an elliptical shape or a parabolic shape projecting to the −Z side. The projection shape of the contact surface 1001*a* may have a sectional shape projecting toward the receiving part 1002 (−Z side) in each of a cross-section orthogonal to the X direction and a cross-section orthogonal to the Y direction. In addition, to suppress a pressure trace on the surface of the sheets, the projection shape is preferably a curved surface that is smoothly curved.

As described above, as a result of the pressure plate 1001 being configured to come into point contact with the sheet stack, the relative inclination between the pressure plate 1001 and the receiving part 1002 can be absorbed, and thus the distribution of the pressurizing force acting on the sheet stack can be maintained to be approximately uniform. In other words, the projection shape of the contact surface 1001*a* of the pressure plate 1001 that enables the point contact with the sheet stack constitutes an equalizing means (inclination correction mechanism or pressure equalizing mechanism) of the present embodiment.

Therefore, also according to the present embodiment, the sheets can be bonded together more stably.

Sixth Embodiment

Figure 11:
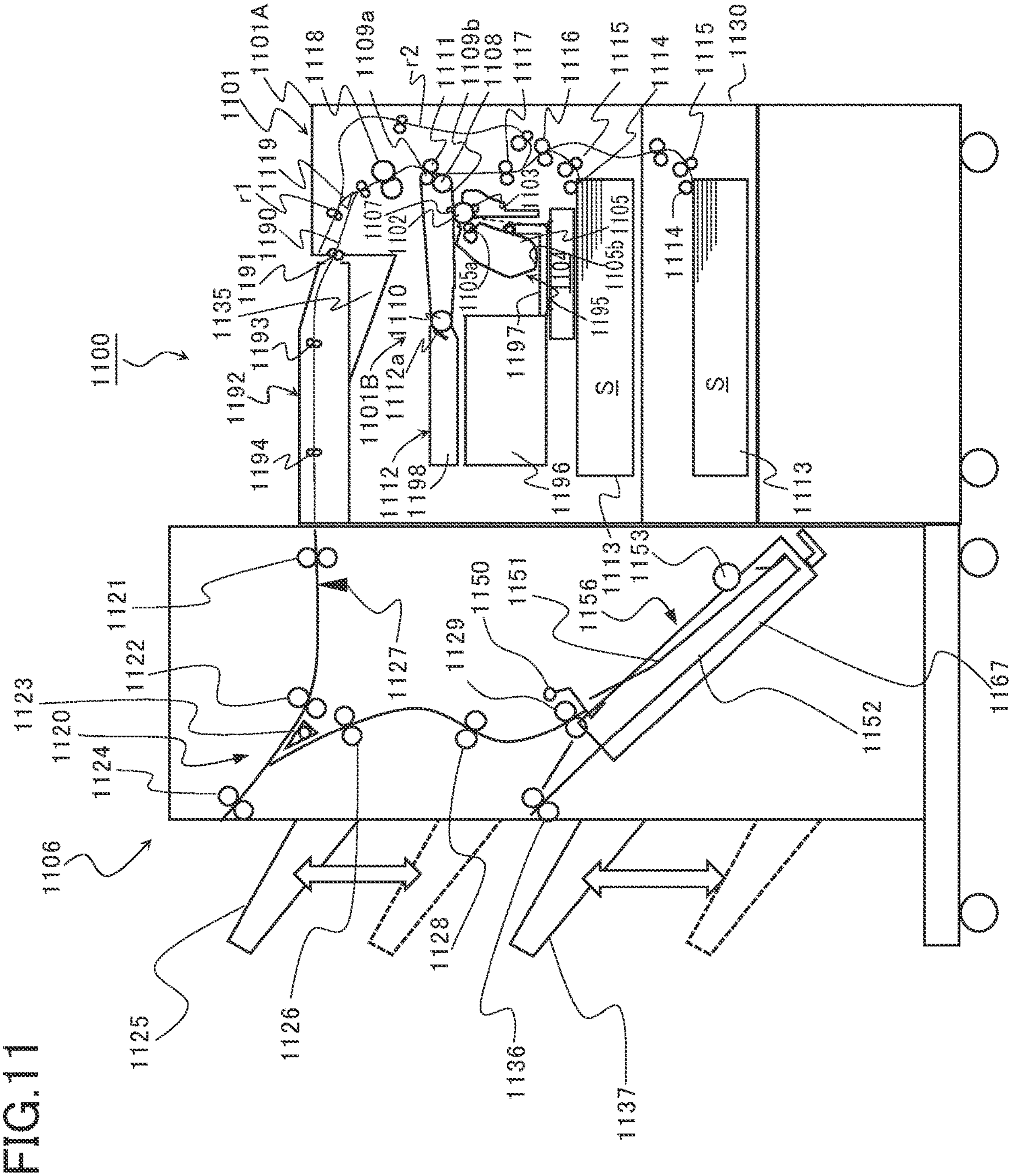
FIG. 11 is a schematic view of an image forming apparatus according to a sixth embodiment.

An image forming apparatus according to a sixth embodiment will be described with reference to FIGS. 11 to 19. FIG. 11 is a schematic view of an image forming apparatus 1100 according to the sixth embodiment. The image forming apparatus 1100 includes a printer body 1101 serving as an image forming apparatus body having an image forming function (printing function), and a sheet processing apparatus 1106 having a sheet bonding function. That is, the image forming apparatus 1100 can be referred to as an image forming system constituted by the printer body 1101 that functions as an image forming apparatus on its own, and the sheet processing apparatus 1106.

The image forming apparatus 1100 of the present embodiment can produce a booklet for which printing and bookbinding have been performed by one apparatus, by forming images on sheets S one sheet at a time by the printer body 1101 and binding the plurality of sheets S by heat-and-press bonding by the sheet processing apparatus 1106. To be noted, various sheet materials of different sizes and materials can be used as the sheets S. Examples of the various sheet materials include paper sheets such as plain paper sheets and cardboards, surface-treated sheet materials such as coated paper sheets, plastic films, cloths, and sheet materials of irregular shapes such as envelopes and index paper sheets.

Image Forming Apparatus Body

The printer body 1101 is an electrophotographic apparatus including a casing 1101A and an image forming portion 1101B of an electrophotographic system disposed inside the casing 1101A. The image forming portion 1101B includes an intermediate transfer belt 1108 serving as an intermediate transfer member, and a process cartridge 1195 disposed along the intermediate transfer belt 1108. The image forming portion 1101B is an electrophotographic unit of an intermediate transfer system. The process cartridge 1195 includes a photosensitive drum 1102 serving as an image bearing member, a charging unit 1103 serving as a charging means or charging portion, and a developing unit 1105 serving as a developing means or developing portion. In addition, the image forming portion 1101B includes a scanner unit 1104 serving as an exposing means or exposing portion, and a primary transfer roller 1107.

The developing unit 1105 includes a developing roller 1105*a* serving as a developing means or developer bearing member, and a toner container 1105*b* that accommodates toner (developer). The developing roller 1105*a* is rotatably held by the toner container 1105*b*.

The process cartridge 1195 is attachable to and detachable from the casing 1101A. A toner cartridge 1196 accommodating toner to be supplied to the developing unit 1105 is detachably attached to the printer body 1101. The "casing 1101A" of the printer body 1101 refers to a portion of the printer body 1101 excluding the process cartridge 1195 and the toner cartridge 1196. The casing 1101A includes a frame member such as a metal frame constituting the frame body of the printer body 1101, and members fixed to the frame body, and defines an attachment space where the process cartridge 1195 and the toner cartridge 1196 are attached.

The process cartridge 1195 forms toner images for recording images on the sheets S by using toner, and also forms bonding toner images for bonding the sheets S together. The printer body 1101 of the present embodiment has a monochromatic printer configuration that records a monochromatic image. The printer body 1101 uses black toner for not only recording images but also as toner (powder adhesive) for bonding. As in a seventh embodiment that will be described later, the toner for bonding does not have to be black toner, and may be toner dedicated to bonding different from toner used for recording an image.

The toner cartridge 1196 and the process cartridge 1195 attached to the casing 1101A are interconnected via a toner conveyance pipe 1197. The toner cartridge 1196 can replenish the developing unit 1105 with toner via the toner conveyance pipe 1197.

A scanner unit 1104 serving as an exposing means or exposing portion is disposed below the process cartridge 1195 in the casing 1101A. A cassette 1113 serving as an accommodating portion that accommodates the sheets S to be used for image formation is attached to the casing 1101A at a position below the scanner unit 1104 such that the cassette 1113 (also referred to as a sheet tray or an accommodation chamber) can be drawn out. Further, one or more optional sheet feeding apparatuses 1130 including an additional cassette 1113 may be connected to a lower portion of the casing 1101A.

The intermediate transfer belt 1108 is a movable (rotatable) endless belt stretched over a driving roller 1109*a*, a stretching roller 1109*b*, and a tension roller 1110 that rotate about axes parallel to each other. The intermediate transfer belt 1108 is moved (rotated or conveyed) in the counterclockwise direction in FIG. 11 by the rotation of the driving roller 1109*a*. On the inner peripheral side of the intermediate transfer belt 1108, the primary transfer roller 1107 serving as a primary transfer member is disposed at a position opposing the photosensitive drum 1102 with the intermediate transfer belt 1108 therebetween. On the outer peripheral side of the intermediate transfer belt 1108, a secondary transfer roller 1111 serving as a transfer member (secondary transfer member) is disposed at a position opposing the driving roller 1109*a* with the intermediate transfer belt 1108 therebetween. As a nip portion between the intermediate transfer belt 1108 and the secondary transfer roller 1111, a secondary transfer portion serving as a transfer portion is formed. The intermediate transfer belt 1108, the primary transfer roller 1107, and the secondary transfer roller 1111 constitute a transfer unit (transfer means) for transferring a toner image formed on the photosensitive drum 1102 serving as an image bearing member onto the sheet S.

A belt cleaner 1112 serving as a cleaning means or cleaning portion that cleans the intermediate transfer belt 1108 is provided at a position opposing the tension roller 1110 with the intermediate transfer belt 1108 therebetween. The belt cleaner 1112 includes a cleaning member 1112*a* such as a blade or a brush provided in contact with the intermediate transfer belt 1108, and a waste toner container 1198 serving as a collection container. The belt cleaner 1112 removes attached matter such as transfer residual toner from the intermediate transfer belt 1108 by the cleaning member 1112*a*, and collects the removed attached matter into the waste toner container 1198.

A fixing unit 1118 serving as a fixing means or fixing portion is disposed above the secondary transfer portion in the casing 1101A. The fixing unit 1118 has a configuration of a thermal fixation system that fixes the toner image by heating. The fixing unit 1118 includes a rotary member pair (for example, a roller pair constituted by a fixing roller and a pressurizing roller) that nips and conveys the sheet S, and a heat source (for example, a halogen lamp or an induction heating mechanism) that heats the toner image on the sheet S via fixing roller.

Image Forming Operation

In the case where the printer body 1101 performs the image forming operation, a sheet S is fed by a feeding roller 1114 serving as a feeding means or feeding portion from the cassette 1113 in the lower portion of the casing 1101A or the cassette 1113 in the sheet feeding apparatus 1130. The separation roller pair 1115 conveys fed sheets S one by one while separating one sheet S from another. This sheet S is conveyed toward a registration roller pair 1117 by a pull-out roller 1116, the leading end of the sheet S abuts a nip portion of the registration roller pair 1117 that is not moving, and thus the skew of the sheet S is corrected. The registration roller pair 1117 delivers the sheet S into the secondary transfer portion at a timing synchronized with the progress of the toner image formation process by the image forming portion 1101B.

Meanwhile, in the image forming portion 1101B, the photosensitive drum 1102 and the intermediate transfer belt 1108 rotate. The charging unit 1103 uniformly charges the surface of the photosensitive drum 1102. The scanner unit 1104 irradiates the photosensitive drum 1102 with laser light on the basis of image information representing an image to be recorded on the sheet S, and thus draws an electrostatic latent image on the photosensitive drum 1102. This electrostatic latent image is developed (visualized) as a black toner image by the developing unit 1105 by using black toner.

Here, in the case of performing heat-and-press bonding that will be described later by the sheet processing apparatus 1106, the scanner unit 1104 draws an electrostatic latent image by irradiating the photosensitive drum 1102 with laser light on the basis of information instructing the bonding position of the sheet S. This electrostatic latent image is developed by the developing unit 1105 by using black toner, and thus a bonding toner image is formed in a region on the photosensitive drum 1102 corresponding to a bonding position on the sheet S.

The toner image formed on the photosensitive drum 1102 (image bearing member) is transferred onto the intermediate transfer belt 1108 through primary transfer by the primary transfer roller 1107, and is conveyed toward the secondary transfer portion by the rotation of the intermediate transfer belt 1108. Then, in the secondary transfer portion, a voltage is applied to the secondary transfer roller 1111, and thus the toner image is transferred onto the sheet S conveyed from the registration roller pair 1117 through secondary transfer. The sheet S having passed through the secondary transfer portion is conveyed to the fixing unit 1118. While the sheet S passes through the nip portion between the fixing roller and the pressurizing roller, the toner image is heated and pressurized, thus the toner softens, then the toner adheres to the sheet S, and thus the image is fixed to the sheet S.

The conveyance path of the sheet S having passed through the fixing unit 1118 is switched by a switching portion 1119. In the case of simplex printing, the sheet S is guided to a discharge path 1190 by the switching portion 1119, and is discharged from the casing 1101A by a discharge roller pair 1191. In the present embodiment, the printer body 1101 is connected to the sheet processing apparatus 1106 via a relay conveyance unit 1192. The sheet S discharged from the discharge roller pair 1191 is passed onto the sheet processing apparatus 1106 via conveyance roller pairs 1193 and 1194 of the relay conveyance unit 1192. In addition, in the case where the relay conveyance unit 1192 and the sheet processing apparatus 1106 are not connected, the discharge roller pair 1191 discharges the sheets S serving as a product onto a supporting tray 1135 provided on an upper portion of the casing 1101A.

In the case of duplex printing, the sheet S on a first surface of which an image has been formed is guided to a reverse conveyance roller pair r1 by the switching portion 1119. Then, the sheet S is reversed and conveyed (switched back and conveyed) by the reverse conveyance roller pair r1, and then conveyed toward the registration roller pair 1117 via a duplex conveyance path r2. The sheet S passes through the secondary transfer portion and the fixing unit 1118, thus an image is formed on a second surface of the sheet S opposite to the first surface, and then the sheet S is discharged from the casing 1101A by the discharge roller pair 1191.

Figure 12:
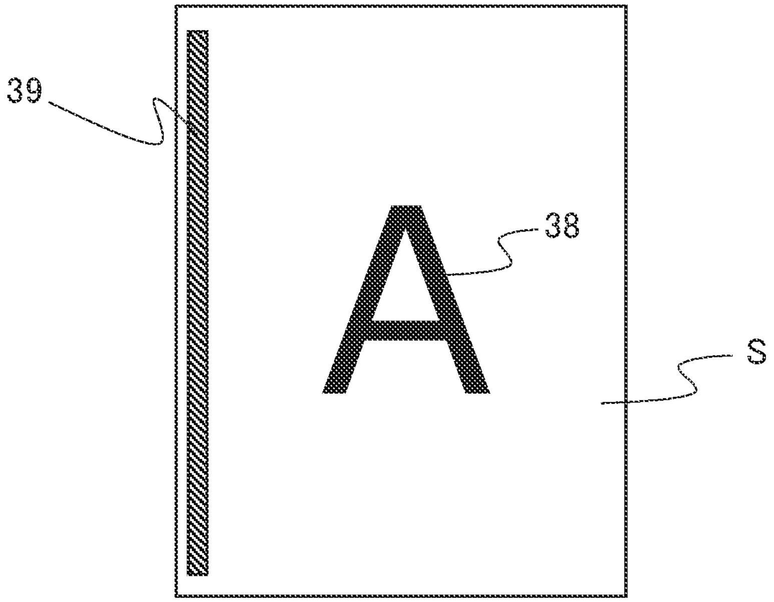
FIG. 12 is a diagram illustrating toner images that a printer body according to the sixth embodiment forms on a sheet.

FIG. 12 is a diagram illustrating an example of a toner image formed on the sheet S. On the illustrated sheet S, a toner image (recording toner image) 38 for recording images such as texts, figures, and photographs, and a toner image (bonding toner image) 39 for bonding sheets together are formed.

The position, shape, and area of the bonding toner image 39 can be changed in accordance with the configuration of a heat-and-press bonding portion 1167 that will be described later.

To be noted, in the case where the image forming apparatus 1100 produces a booklet by simplex printing, the bonding toner image 39 is formed on only one surface of each sheet S (surface on which the recording toner image is formed). In the case of forming a booklet by duplex printing, the bonding toner image 39 may be formed on only one surface of each sheet S, or may be formed on both surfaces of each sheet S.

Sheet Processing Apparatus

The sheet processing apparatus 1106 includes a buffer portion 1120 serving as a buffer means or buffer mechanism in which a plurality of sheets S are stacked, an alignment portion 1156 serving as an alignment means or alignment mechanism that aligns the plurality of sheets S, and the heat-and-press bonding portion 1167 that performs heat-and-press bonding of the sheets S. The heat-and-press bonding portion 1167 is an example of a sheet bonding apparatus (bonding unit, bonding means, heat-and-press bonding means, or sticking processing portion) that bonds sheets together. In addition, the sheet processing apparatus 1106 includes a discharge upper tray 1125 and a discharge lower tray 1137 each capable of ascending and descending as discharge destinations for discharging the product of the image forming apparatus 1100.

The sheet processing apparatus 1106 is a sheet processing apparatus that receives a plurality of sheets S on which images are formed one sheet at a time by the printer body 1101, performs bonding processing (heat-and-press bonding) of the sheets S, and outputs the sheets S as a sheet stack (booklet). Details of the buffer portion 1120, the alignment portion 1156, and the heat-and-press bonding portion 1167 will be described later. In addition, the sheet processing apparatus 1106 is also capable of discharging the sheets S subjected to image formation by the printer body 1101 onto the discharge upper tray 1125 or the discharge lower tray 1137 without performing the processing.

Buffer Portion

Figure 13:
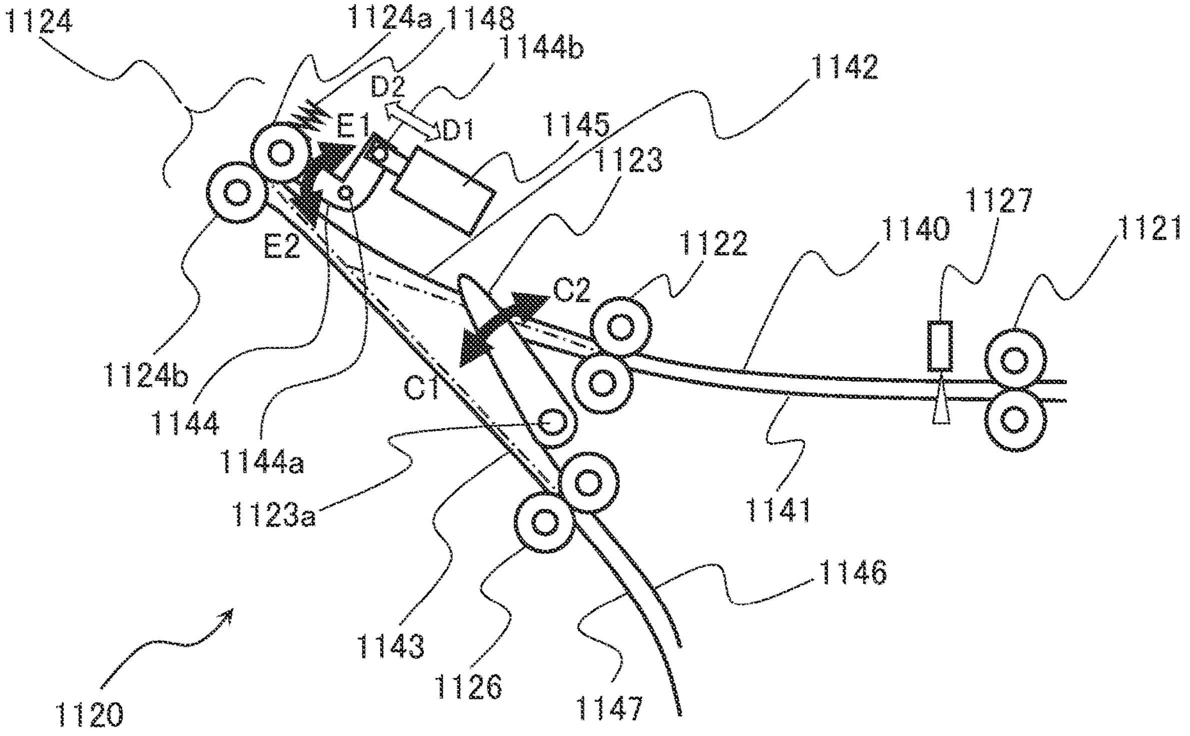
FIG. 13 is a diagram illustrating a buffer portion of a sheet processing apparatus according to the sixth embodiment.

The buffer portion 1120 will be described with reference to FIG. 13. FIG. 13 is an enlarged view of a cross-section of the buffer portion 1120. The buffer portion 1120 includes an inlet roller pair 1121, a pre-buffer roller pair 1122, a non-return flap 1123, a reverse conveyance roller pair 1124, and an inner discharge roller pair 1126. In addition, the buffer portion 1120 includes an entrance sensor 1127 that detects a sheet, and a separation mechanism including a plunger solenoid 1145 and the like for opening and closing the reverse conveyance roller pair 1124 (bringing the reverse conveyance roller pair 1124 into and out of contact from each other).

The inlet roller pair 1121, the pre-buffer roller pair 1122, the reverse conveyance roller pair 1124, and the inner discharge roller pair 1126 are each a roller pair that nips and conveys the sheet. The inlet roller pair 1121 and the pre-buffer roller pair 1122 are disposed on a conveyance path (inlet path) for the sheet processing apparatus 1106 to receive the sheets S. The reverse conveyance roller pair 1124 is disposed on a conveyance path (first discharge path illustrated in FIG. 11) communicating with the discharge upper tray 1125. The inner discharge roller pair 1126 is disposed on a conveyance path (inner discharge path illustrated in FIG. 11) extending from the reverse conveyance roller pair 1124 to the heat-and-press bonding portion 1167. To be noted, the sheet processing apparatus 1106 includes a conveyance path (second discharge path illustrated in FIG. 11) extending from the heat-and-press bonding portion 1167 to the discharge lower tray 1137.

The inlet path is defined by an inlet upper guide 1140 and an inlet lower guide 1141. The first discharge path is defined by a reverse conveyance upper guide 1142 and a reverse conveyance lower guide 1143. The inner discharge path is defined by an inner discharge upper guide 1146 and an inner discharge lower guide 1147.

The entrance sensor 1127 is disposed so as to detect a sheet received by the inlet roller pair 1121. As the entrance sensor 1127, for example, a photosensor of a reflection type that determines whether or not a sheet S is present by irradiating the inlet path with infrared light through an opening provided in the inlet upper guide 1140 and detecting reflection light from the sheet S. The inlet lower guide 1141 may have a hole larger than the spot diameter of the infrared light emitted from the entrance sensor 1127 such that the infrared light is not reflected when a sheet is not passing through the inlet path.

The non-return flap 1123 is disposed downstream of the pre-buffer roller pair 1122 in a sheet conveyance direction in the inlet path. The non-return flap 1123 is disposed to be rotatable about a rotation shaft 1123*a* with respect to the inner discharge upper guide 1146. The non-return flap 1123 is movable to a first position where the non-return flap 1123 suppresses movement (backward movement) of the sheet from the first discharge path to the inlet path and a second position where the non-return flap 1123 allows movement of the sheet from the inlet path to the first discharge path. The non-return flap 1123 is urged in a C2 direction from the second position toward the first position by an unillustrated spring. The non-return flap 1123 is configured to move in a C1 direction from the first position toward the second position by being pushed by the sheet, and return to the first position when the sheet has passed.

As viewed in a rotational axis direction of the non-return flap 1123, a distal end portion of the non-return flap 1123 at the first position overlaps with the reverse conveyance upper guide 1142. In addition, the distal end portion of the non-return flap 1123 is formed in a comb-tooth shape such that the overlap with the reverse conveyance upper guide 1142 is possible. In addition, as viewed in the rotational axis direction of the non-return flap 1123, a space that the sheet can pass through is formed between the non-return flap 1123 at the second position and the reverse conveyance upper guide 1142.

The reverse conveyance roller pair 1124 is constituted by a reverse conveyance upper roller 1124*a* and a reverse conveyance lower roller 1124*b*, and drive is supplied to each of the rollers. The reverse conveyance upper roller 1124*a* and the reverse conveyance lower roller 1124*b* are configured to rotate in synchronization all the time. In addition, a separation lever 1144 is coupled to the reverse conveyance upper roller 1124*a*. The separation lever 1144 is supported so as to be pivotable about a lever support shaft 1144*a* of the reverse conveyance upper guide 1142. In addition, the separation lever 1144 is rotatably coupled to the plunger solenoid 1145 via a solenoid coupling shaft 1144*b*.

When a current flows in the plunger solenoid 1145, the core thereof moves in a D1 direction in FIG. 13, and thus the separation lever 1144 pivots in an E1 direction in the drawing. In this case, the reverse conveyance roller pair 1124 takes a separation state in which the reverse conveyance upper roller 1124*a* and the reverse conveyance lower roller 1124*b* are separated from each other (state in which the nip portion is open). In addition, when the current flowing in the plunger solenoid 1145 is stopped, the reverse conveyance upper roller 1124*a* moves in an E2 direction by the urging force of a pressurizing spring 1148, and the core of the plunger solenoid 1145 moves in a D2 direction. In this case, the reverse conveyance roller pair 1124 takes a contact state in which the reverse conveyance upper roller 1124*a* and the reverse conveyance lower roller 1124*b* are in contact with each other (state in which the nip portion is closed).

Buffer Operation

Next, the operation of the buffer portion 1120 will be described. FIGS. 14A to 14H are each a diagram illustrating the operation of the buffer portion 1120. In the description below, it is assumed that a sheet S1, a sheet S2, and a sheet S3 are conveyed from the printer body 1101 to the sheet processing apparatus 1106 in this order.

The buffer portion 1120 performs an operation of sequentially stacking newly conveyed sheets on a sheet or already stacked sheets while reciprocating the sheet or sheet stack between the reverse conveyance roller pair 1124 and the inner discharge roller pair 1126. This operation will be hereinafter referred to as a buffer operation. In addition, the sheet processing apparatus 1106 accelerates the sheet conveyance speed of the apparatus. In the description below, the sheet conveyance speed of the inlet roller pair 1121 will be denoted by V1, and the sheet conveyance speed of the pre-buffer roller pair 1122, the reverse conveyance roller pair 1124, and the inner discharge roller pair 1126 (accelerated conveyance speed) will be denoted by V2.

Figure 14A:
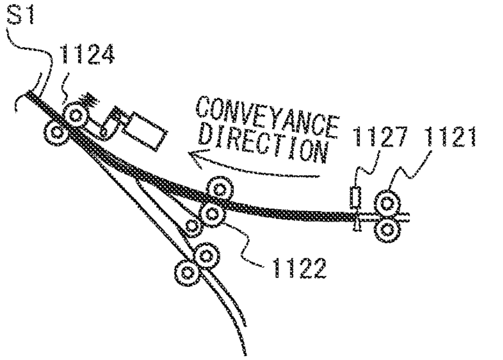
FIGS. 14A to 14H are each a diagram illustrating an operation of a buffer portion according to the sixth embodiment.

As illustrated in FIG. 14A, when the trailing end of the preceding sheet S1 passes the entrance sensor 1127, the conveyance speed of the pre-buffer roller pair 1122 and the reverse conveyance roller pair 1124 for the sheet S1 is accelerated from V1 to V2. As a result of this, the conveyance interval between the sheet S1 and the succeeding sheet S2 is increased, and thus the reverse conveyance roller pair 1124 can switch back the sheet S1 without the sheet S2 colliding with the sheet S1.

Figure 14B:
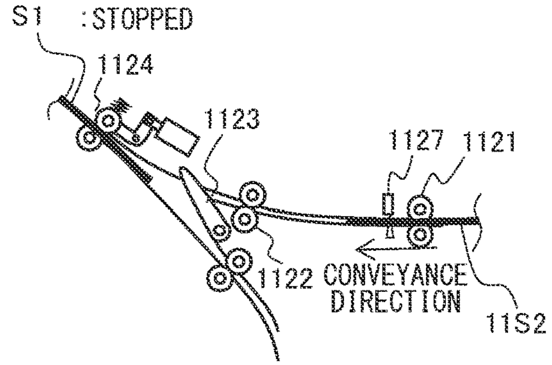

As illustrated in FIG. 14B, when the trailing end of the sheet S1 passes the non-return flap 1123, conveyance by the reverse conveyance roller pair 1124 is temporarily stopped.

Figure 14C:
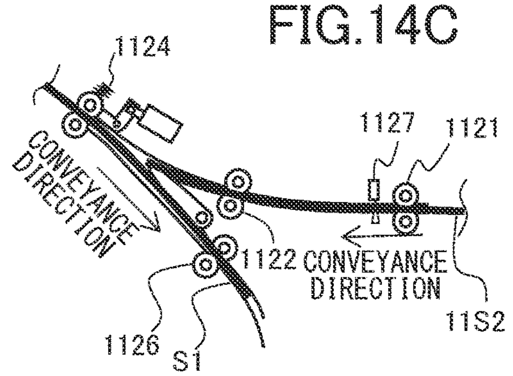

As illustrated in FIG. 14C, the reverse conveyance roller pair 1124 changes the rotational direction thereof, and conveys the sheet S1 toward the inner discharge roller pair 1126.

Figure 14D:
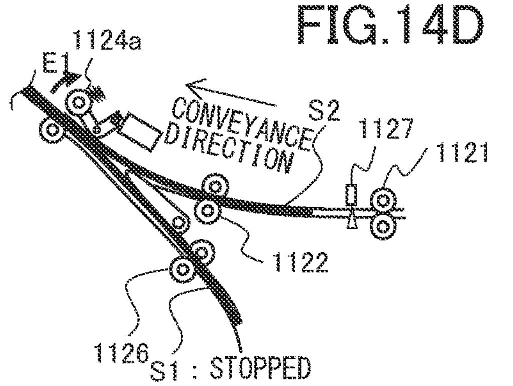

As illustrated in FIG. 14D, the conveyance of the sheet S1 by the reverse conveyance roller pair 1124 and the inner discharge roller pair 1126 is stopped at a position where the leading end of the sheet S1 has passed the inner discharge roller pair 1126 by a predetermined amount. In addition, the reverse conveyance upper roller 1124*a* moves in the E1 direction after the sheet S1 is nipped by the inner discharge roller pair 1126. As a result of this, the reverse conveyance roller pair 1124 is opened, and thus it becomes possible to receive the succeeding sheet S2. After the reverse conveyance upper roller 1124*a* is separated, the succeeding sheet S2 is conveyed to the reverse conveyance roller pair 1124.

Figure 14E:
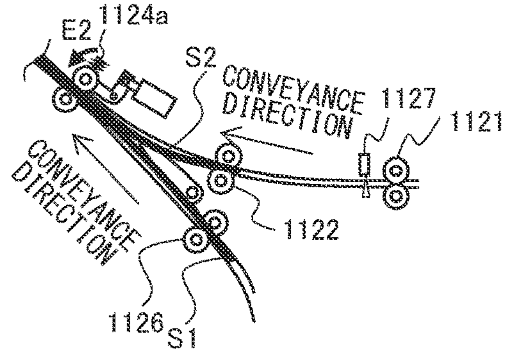

As illustrated in FIG. 14E, when the trailing end of the succeeding sheet S2 passes the entrance sensor 1127, similarly to the sheet S1, the conveyance speed of the sheet S2 is accelerated from V1 to V2. At a timing at which the sheet S2 reaches a predetermined target position, the inner discharge roller pair 1126 conveys the sheet S1 toward the reverse conveyance roller pair 1124. At a timing at which the speed of the sheet S1 and the speed of the sheet S2 are approximately equal, that is, at a timing at which the speed difference between the sheet S1 and the sheet S2 is substantially 0, the reverse conveyance upper roller 1124*a* moves in the E2 direction, and the reverse conveyance roller pair 1124 takes the contact state. When the reverse conveyance roller pair 1124 is in the contact state, the reverse conveyance roller pair 1124 simultaneously nips the sheet S1 and the sheet S2. In addition, the speed of the reverse conveyance roller pair 1124 is adjusted such that the speed becomes equal to the conveyance speed of the sheets S1 and S2 before the reverse conveyance roller pair 1124 switches from the separation state to the contact state.

Figure 14F:
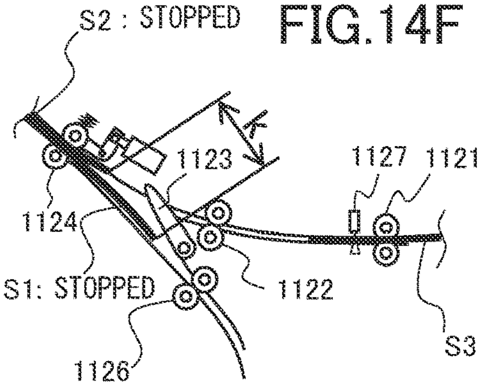

As illustrated in FIG. 14F, after the trailing end of the sheet S2 has passed the non-return flap 1123, the reverse conveyance roller pair 1124 temporarily stops again. Here, the target position described above is set such that the sheet S1 projects by a predetermined amount k with respect to the sheet S2 in a conveyance direction from the inner discharge roller pair 1126 toward the alignment portion 1156. In other words, in the sheet stack supported in the buffer portion 1120, the sheet S1 that is on the lower side at the alignment portion 1156 projects to the downstream side in the conveyance direction toward the alignment portion 1156 more than the sheet S2 that is on the upper side at the alignment portion 1156.

Figure 14G:
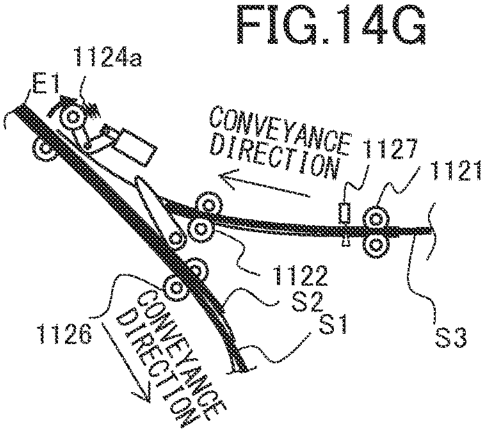

As illustrated in FIG. 14G, the reverse conveyance roller pair 1124 changes the rotational direction thereof, and conveys the sheets S1 and S2 toward the inner discharge roller pair 1126. The sheets S1 and S2 are conveyed toward the alignment portion 1156 by the inner discharge roller pair 1126. The reverse conveyance upper roller 1124*a* moves in the E1 direction after the sheet S1 is nipped by the inner discharge roller pair 1126. As a result of this, the reverse conveyance roller pair 1124 is opened, and takes a state in which the succeeding sheet S3 can be received.

Figure 14H:
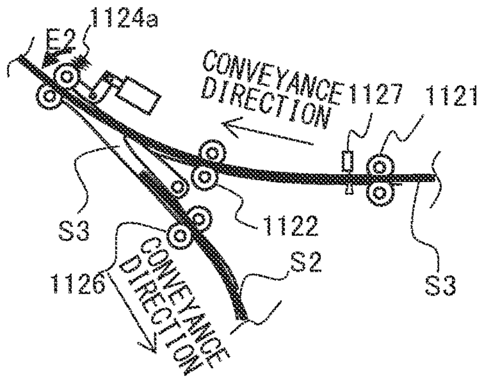

As illustrated in FIG. 14H, after the trailing end of the sheet S2 has passed the reverse conveyance roller pair 1124, the reverse conveyance upper roller 1124*a* moves in the E2 direction. As a result of this, the reverse conveyance roller pair 1124 takes the contact state, and nips and conveys the sheet S3.

By performing the above-described buffer operation repeatedly, the buffer portion 1120 can deliver a predetermined number of sheets to the alignment portion 1156 in a stacked state. In addition, although the buffer operation in which two sheets are stacked has been described as an example, the sheet S3 can be stacked on the sheets S1 and S2 by temporarily stopping the conveyance of the sheets S1 and S2 in the state of FIG. 14G and conveying the sheets S1 and S2 in the reverse conveyance direction. That is, the buffer portion 1120 can produce a sheet stack in which three or more sheets (for example, five sheets) are stacked, by repeating the operation of FIGS. 14D to 14G.

To be noted, the target position for stacking the sheets is determined on the basis of the timing at which the entrance sensor 1127 has detected the trailing end of the sheet. Therefore, even if the length of the sheet in the conveyance direction is changed, sheets can be stacked in a displaced manner by displacing the sheet by a predetermined amount k by the buffer operation of the present embodiment.

The sheet stack supported in the buffer portion 1120 is conveyed from the inner discharge roller pair 1126 to a kick-out roller pair 1129 via an intermediate conveyance roller pair 1128 as illustrated in FIG. 11. Then, the kick-out roller pair 1129 conveys the sheet stack to the alignment portion 1156 (intermediate supporting portion or processing stage) constituted by an intermediate upper guide 1151, an intermediate lower guide 1152, and the like. In addition, a stack pressing flag 1150 that suppresses lifting of the trailing end of stacked sheets such that the trailing end of the sheets already stacked at the alignment portion 1156 does not interfere with the leading end of the succeeding sheet conveyed to the alignment portion 1156 is disposed downstream of the kick-out roller pair 1129.

Configuration of Alignment Portion

Figure 15:
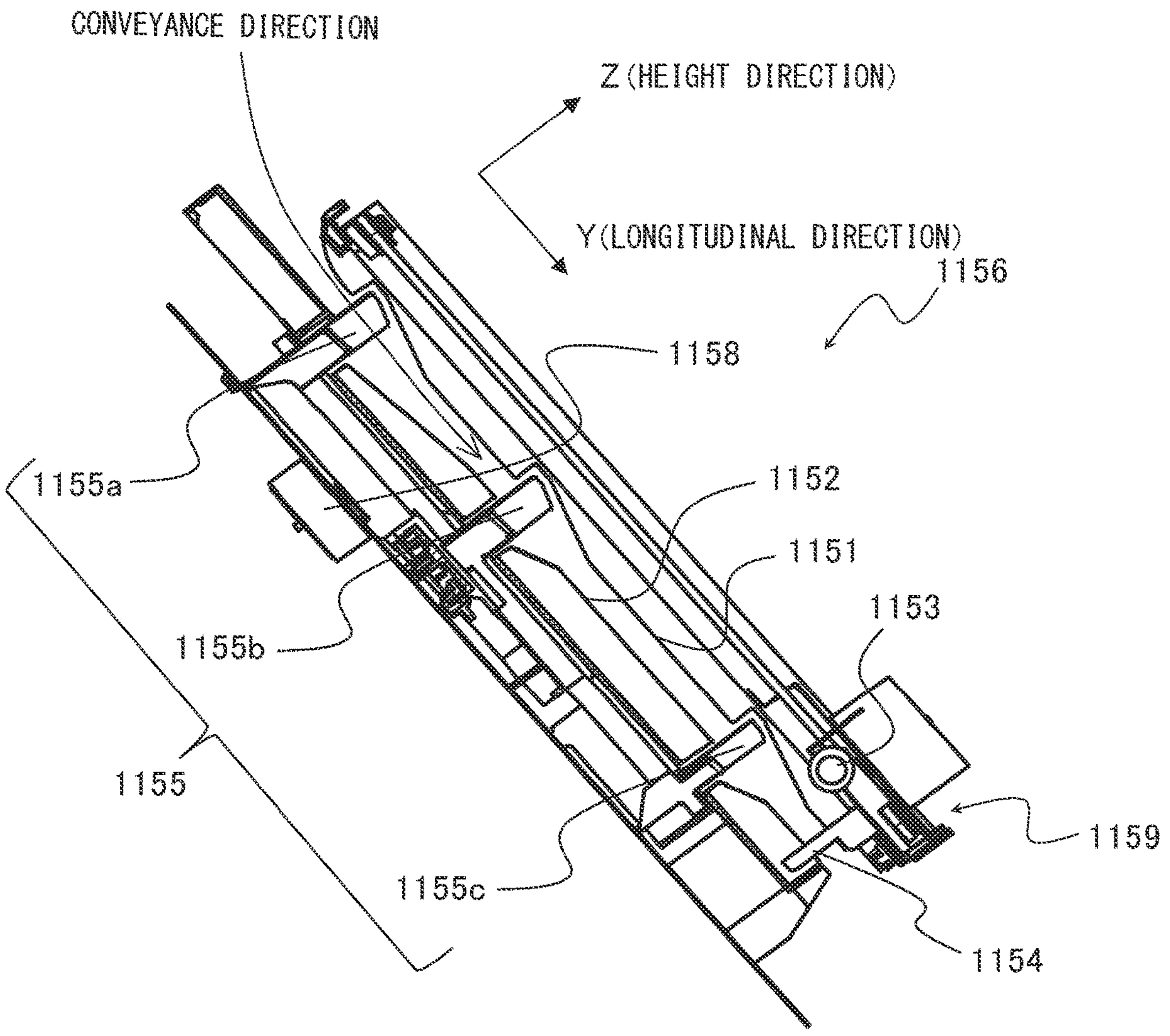
FIG. 15 is a diagram illustrating an alignment portion of the sheet processing apparatus according to the sixth embodiment.
Figure 16:
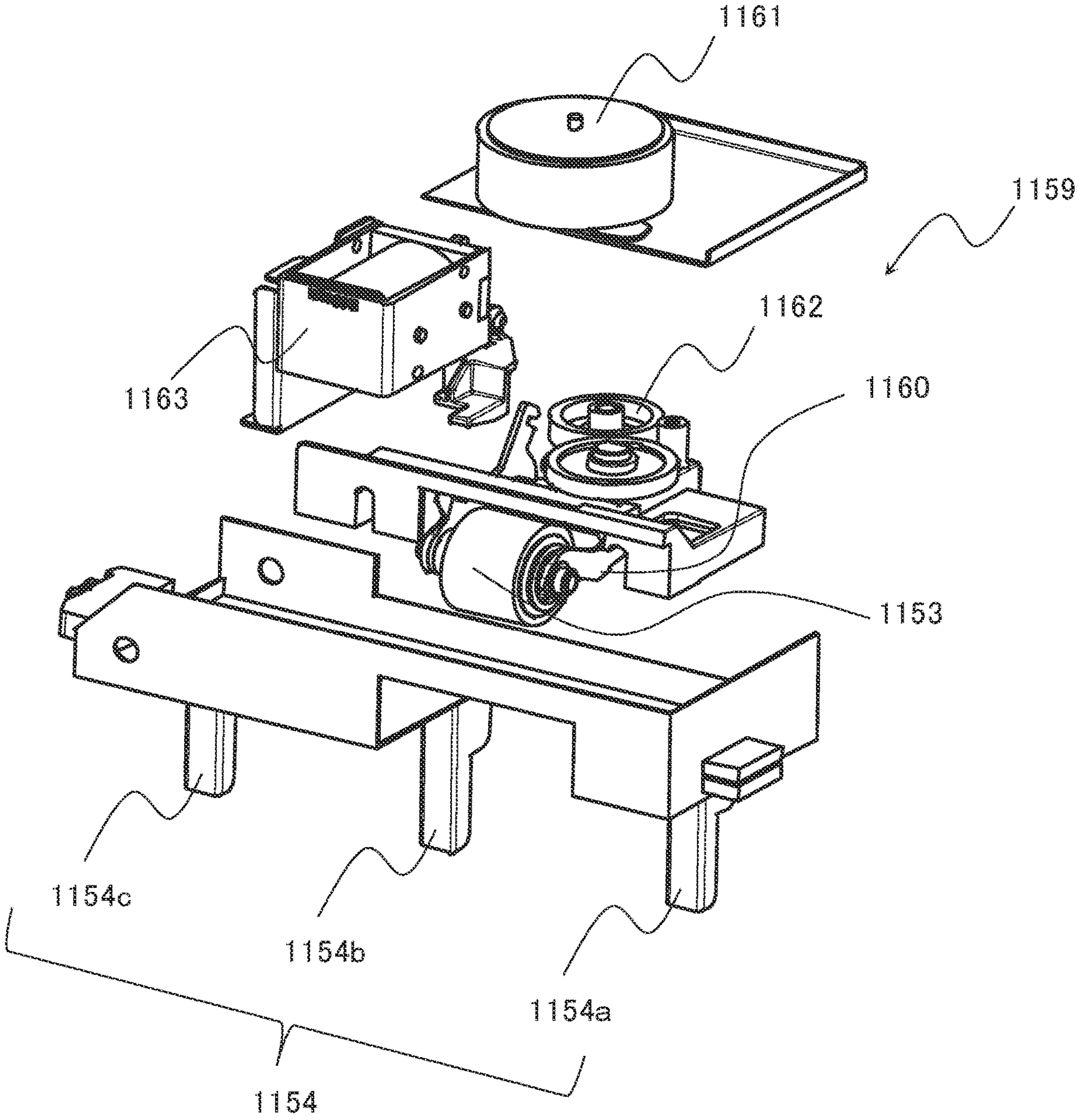
FIG. 16 is a diagram illustrating a movable unit of the alignment portion according to the sixth embodiment.

Next, the configuration of the alignment portion 1156 will be described with reference to FIGS. 15 and 16. FIG. 15 is a section view of the alignment portion 1156. FIG. 16 is a diagram illustrating the constituent elements of a movable unit 1159 in an exploded view.

In the description and each drawing below, a direction in which the pressurizing member of the heat-and-press bonding portion 1167 moves with respect to the receiving member to pressurize the sheet stack will be referred to as a Z direction. The Z direction is a height direction (thickness direction) of the sheet stack supported at the alignment portion 1156. In addition, directions orthogonal to each other in a virtual plane orthogonal to the Z direction will be referred to as an X direction and a Y direction. If necessary, the sides indicated by arrows X, Y, and Z in each diagram will be respectively expressed as the +X side, +Y side, and +Z side, and sides opposite thereto will be respectively expressed as the −X side, −Y side, and −Z side.

In the present embodiment, the Y direction is substantially parallel to a conveyance direction in which the sheet is conveyed to the alignment portion 1156 by the kick-out roller pair 1129. In addition, in the present embodiment, the X direction is a sheet width direction orthogonal to the conveyance direction. In the description below, the Y direction will be referred to as a "longitudinal direction", and the X direction will be referred to as a "width direction" or a "lateral direction" in some cases.

The alignment portion 1156 includes the intermediate lower guide 1152 serving as a stacking portion or supporting portion on which the sheet stack is stacked (supported), the intermediate upper guide 1151 opposing the intermediate lower guide 1152, and the movable unit 1159 including a longitudinal alignment standard plate 1154 and a longitudinal alignment roller 1153.

As illustrated in FIG. 16, the longitudinal alignment standard plate 1154 includes a plurality of sheet abutting portions 1154*a*, 1154*b*, and 1154*c* arranged in the sheet width direction. The sheet abutting portions 1154*a*, 1154*b*, and 1154*c* serve as standard positions for sheet alignment in the sheet conveyance direction (Y direction). The longitudinal alignment roller 1153 is rotatably held by a roller holder 1160. The roller holder 1160 is swingable by a driving force of a solenoid 1163. By the swing of the roller holder 1160, the longitudinal alignment roller 1153 can move to a position where the longitudinal alignment roller 1153 abuts the sheets S on the intermediate lower guide 1152 and a position where the longitudinal alignment roller 1153 is retracted upward from the sheets S.

In addition, a driving motor 1161 is attached to the movable unit 1159. The driving force of the driving motor 1161 is transmitted via a gear train 1162, and thus the longitudinal alignment roller 1153 rotates. The movable unit 1159 is movable in the sheet conveyance direction (Y direction) with respect to the intermediate lower guide 1152 as an integrated unit.

Figure 17A:
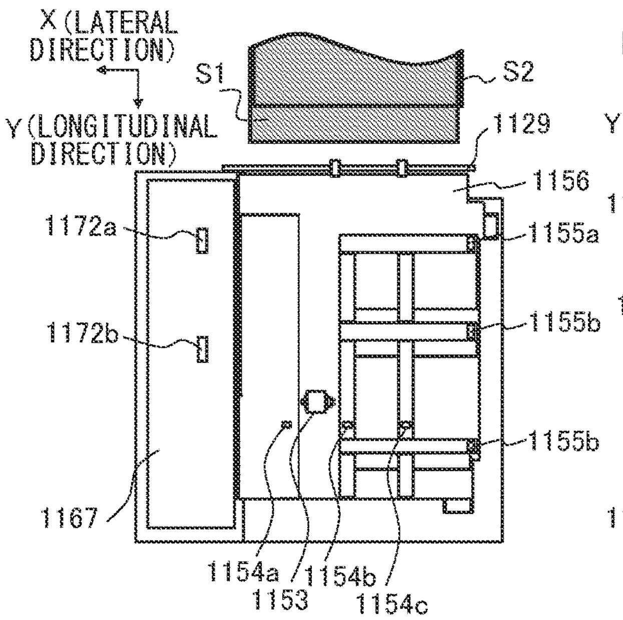
FIGS. 17A to 17D are each a diagram illustrating an operation of the alignment portion according to the sixth embodiment.

As illustrated in FIG. 15, the alignment portion 1156 includes a width alignment member 1155, a driving motor 1158, and width alignment standard plates 1172*a* and 1172*b* as illustrated in FIG. 17A. The width alignment member 1155 is movable in the sheet width direction (X direction) by the driving force of the driving motor 1158. The width alignment member 1155 includes a plurality of sheet pressing portions 1155*a*, 1155*b*, and 1155*c* arranged in the sheet conveyance direction. As illustrated in FIG. 17A, the width alignment standard plates 1172*a* and 1172*b* are constituted by a plurality of plate-like members (sheet abutting portions) arranged in the sheet conveyance direction. The width alignment standard plates 1172*a* and 1172*b* serve as standard positions for sheet alignment in the sheet width direction (X direction).

Alignment Operation

The operation of the alignment portion 1156 will be described with reference to FIGS. 17A to 17D. FIGS. 17A to 17D are each a schematic diagram illustrating the alignment portion 1156 as viewed from the upper side in the Z direction. Illustration of the intermediate upper guide 1151 and the like is omitted.

In the case of aligning the sheet stack in the alignment portion 1156, the movable unit 1159 is positioned at a predetermined standby position in advance in the sheet conveyance direction (Y direction) in accordance with the sheet size. The standby position is a position where the distance from a nip position of the kick-out roller pair 1129 to the sheet abutting portions 1154*a* to 1154*c* of the longitudinal alignment standard plate 1154 in the Y direction is slightly larger than the length of the sheet.

The operation of the alignment portion 1156 in the case where five sheets S1 to S5 stacked in the buffer portion 1120 is conveyed thereto will be described below.

FIG. 17A illustrates a state in which the first sheet S1 and the second sheet S2 are conveyed toward the alignment portion 1156. The movable unit 1159 (longitudinal alignment standard plate 1154 and longitudinal alignment roller 1153) has moved to the standby position corresponding to the sheet size. The width alignment member 1155 stands by at a position slightly outward from a side end position of the sheet stack such that conveyance of the sheet stack is not interrupted.

Figure 17B:
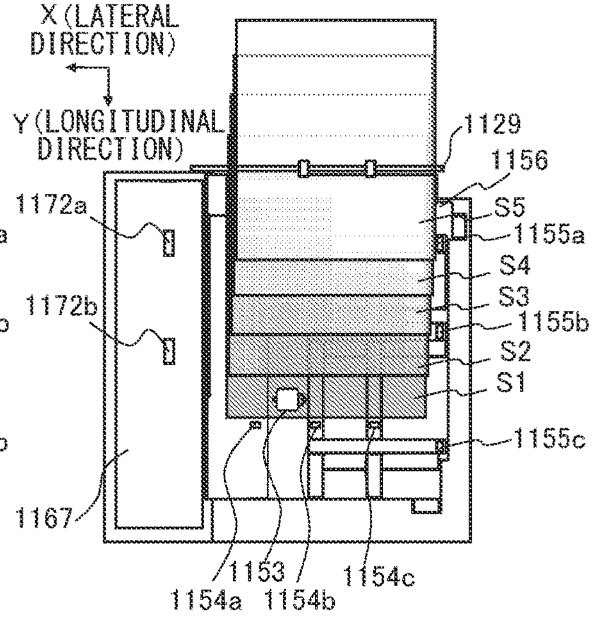

FIG. 17B illustrates a state in which the trailing end of the first sheet S1 has passed the nip of the kick-out roller pair 1129 and the leading end of the sheet S1 has reached the longitudinal alignment roller 1153. The longitudinal alignment roller 1153 has moved down in advance to the abutting position in response to power supply to the solenoid 1163, and is being rotated by the driving motor 1161.

The sheet S1 is conveyed to the +Y side and caused to abut the longitudinal alignment standard plate 1154 by the longitudinal alignment roller 1153, and is thus aligned in the sheet conveyance direction. Then, each time one of the sheets S2 to S5 is released from the kick-out roller pair 1129, the sheet is aligned in the sheet conveyance direction by being conveyed to the +Y side and caused to abut the longitudinal alignment standard plate 1154 by the longitudinal alignment roller 1153.

Figure 17C:
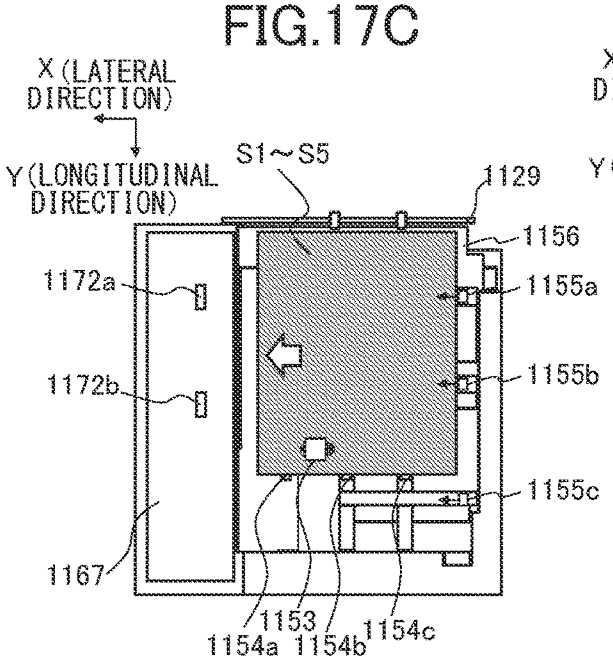

FIG. 17C illustrates a state in which the five sheets S1 to S5 have been caused to abut the longitudinal alignment standard plate 1154 and alignment in the sheet conveyance direction has been completed. In this state, the width alignment member 1155 is moved in the sheet width direction (X direction) by the driving force of the driving motor 1158 illustrated in FIG. 11. One side end of the sheets S1 to S5 is pressed by the sheet pressing portions 1155*a*, 1155*b*, and 1155*c* of the width alignment member 1155, and thus the sheets S1 to S5 move toward the width alignment standard plates 1172*a* and 1172*b*.

Figure 17D:
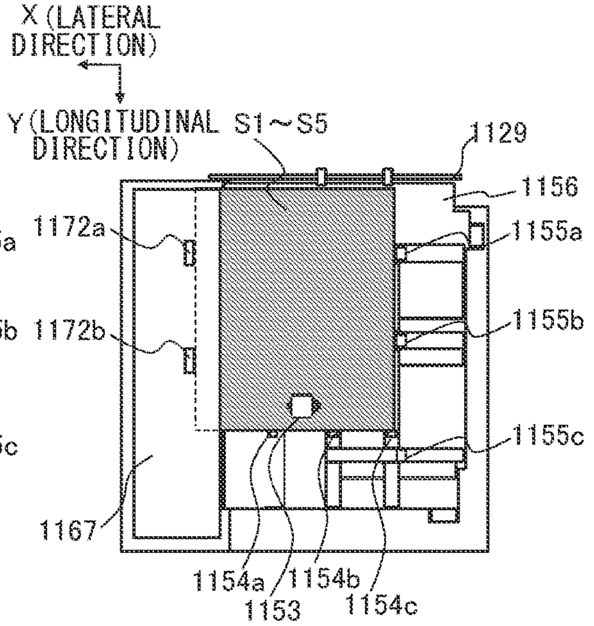

FIG. 17D illustrates a state in which the side end of each of the sheets S1 to S5 has been caused to abut the width alignment standard plates 1172*a* and 1172*b*. As a result of this, the sheets S1 to S5 are aligned in the sheet width direction. Then, heat-and-press bonding is performed on the five sheets S1 to S5 by the heat-and-press bonding portion 1167 that will be described later. In addition, in the case of producing a booklet formed from six or more sheets, the alignment portion 1156 is prepared for receiving a sixth sheet and subsequent sheets in parallel with the heat-and-press bonding on the sheets S1 to S5. Specifically, the width alignment member 1155 is moved in a retraction direction (−X side).

Heat-and-Press Bonding Portion

Figure 18A:
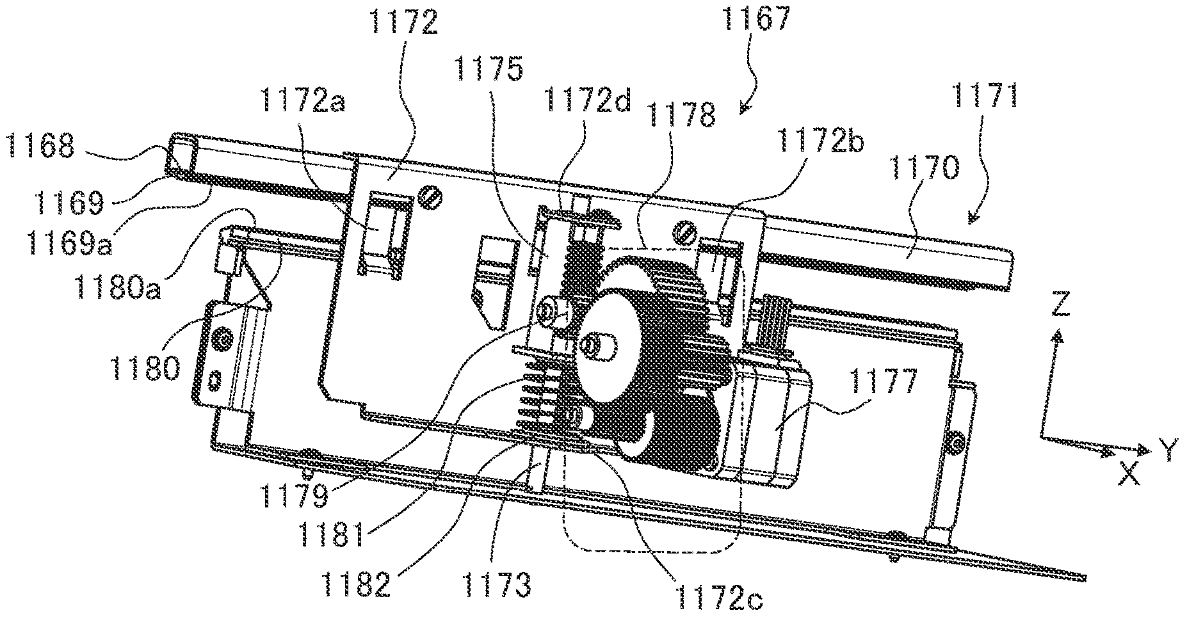
FIGS. 18A to 18D are each a diagram for describing a heat-and-press bonding portion according to the sixth embodiment.

The configuration of the heat-and-press bonding portion 1167 according to the present embodiment will be described with reference to FIG. 18A. FIG. 18A is a perspective view of the heat-and-press bonding portion 1167.

The heat-and-press bonding portion 1167 is an example of a sheet bonding apparatus (bonding unit, bonding means, heat-and-press bonding means, or sticking processing portion) that bonds sheets together. As illustrated in FIG. 18A, the heat-and-press bonding portion 1167 includes a heater portion 1171 including a pressure plate 1169, a receiving plate 1180 opposing the pressure plate 1169, and a driving system including a motor 1177.

The receiving plate 1180 is formed from an elastic material (elastomer) such as silicone rubber. The receiving plate 1180 is an example of a receiving member that receives the pressurizing force of the pressurizing member. The receiving plate 1180 has a thin plate shape longer in the Y direction with the Z direction as a thickness direction thereof. The receiving plate 1180 has a contact surface 1180*a* that comes into contact with a lower surface of the sheet stack. The contact surface 1180*a* of the present embodiment is a flat surface extending substantially orthogonally to the Z direction.

The heater portion 1171 includes a pressure plate 1169, a ceramic heater 1168, and a metal stay 1170. The pressure plate 1169 is an example of a pressurizing member that pressurizes the sheet stack serving as a bonding target. The ceramic heater 1168 is an example of a heating means or heating portion that heats the pressurizing member.

The pressure plate 1169 has a thin plate shape elongated in the Y direction with the Z direction as the thickness direction. The pressure plate 1169 is, for example, formed from aluminum. The heat-and-press bonding portion 1167 can perform, by using the pressure plate 1169 extending in the Y direction, heat-and-press bonding on the sheet stack supported in the alignment portion 1156, along one side extending in the Y direction. The alignment portion 1156 and the heat-and-press bonding portion 1167 of the present embodiment can perform so-called long edge binding in which sheets of the A4 size or the like are aligned in such an orientation that the long side of the sheets is parallel to the sheet conveyance direction (long edge feeding orientation) and in which heat-and-press bonding is performed in a bonding region along the long side as illustrated in FIG. 12. To be noted, a binding method different from the long edge binding may be performed by changing the shapes of the pressure plate 1169 and the receiving plate 1180, the position of the heat-and-press bonding portion 1167, and the like.

The pressure plate 1169 has a contact surface 1169*a* that comes into contact with the upper surface of the sheet stack. The contact surface 1169*a* of the present embodiment has a ridge portion (projection portion illustrated in FIG. 19A) having a sectional shape whose center portion in the X direction projects in the pressurizing direction (−Z side) and extending in the Y direction.

The ceramic heater 1168 is a heater board including a ceramic substrate and a pattern of heat-generating resistor formed thereon. The ceramic heater 1168 is disposed to be in contact with the pressure plate 1169. The pressure plate 1169 and the ceramic heater 1168 are held by the metal stay 1170. A lift plate 1172 is fixed to the metal stay 1170 of the heater portion 1171. The lift plate 1172 integrally moves with the heater portion 1171. To be noted, in the present embodiment, the width alignment standard plates 1172*a* and 1172*b* described above are formed as a single body integrated with the lift plate 1172 by bending part of a metal plate member constituting the lift plate 1172.

In addition, the heater portion 1171 includes a temperature detection means or temperature detection portion such as a thermistor for detecting the temperature of the ceramic heater 1168. The controller of the sheet processing apparatus 1106 controls power supply to the ceramic heater 1168 in accordance with the detection result of the temperature detection means (temperature detection portion), and thus controls the surface temperature of the pressure plate 1169 to a predetermined temperature suitable for heat-and-press bonding.

The driving system of the heat-and-press bonding portion 1167 includes a motor 1177 serving as a drive source, a gear train 1178, a pinion gear 1179, and a rack gear 1175. The gear train 1178, the pinion gear 1179, and the rack gear 1175 are an example of a drive transmission mechanism that converts the rotation of the motor 1177 to force in the movement direction of the heater portion 1171 (Z direction), and transmits the converted force to the heater portion 1171.

The pinion gear 1179 is coupled to the motor 1177 via the gear train 1178. The pinion gear 1179 is engaged with the rack gear 1175. The gear train 1178, the pinion gear 1179, and the rack gear 1175 constitute a speed reduction mechanism for obtaining a pressurizing force required for the heat-and-press bonding of the sheet stack. To be noted, as the speed reduction mechanism, for example, a worm gear or a planetary gear mechanism may be used.

The rack gear 1175 is guided by a columnar guide shaft 1173 extending in the Z direction, and reciprocates in the Z direction. The guide shaft 1173 is fixed to the frame body of the heat-and-press bonding portion 1167.

A compression spring 1181 is disposed between the lift plate 1172 and the rack gear 1175. The upper end portion (+Z-side end) of the compression spring 1181 abuts the lower end portion (−Z-side end) of the rack gear 1175. The lower end portion (−Z-side end) of the compression spring 1181 abuts a receiving surface 1172*c* provided at the lower end portion (−Z-side end) of the lift plate 1172 via the receiving part 1182.

When the heat-and-press bonding portion 1167 is not performing the heat-and-press bonding of the sheet stack, the rack gear 1175 is positioned with respect to the lift plate 1172 by the urging force of the compression spring 1181. Specifically, the rack gear 1175 urged toward the upper side (+Z side) by the compression spring 1181 abuts an abutment surface 1172*d* of the lift plate 1172, and thus the rack gear 1175 is positioned in the Z direction.

In the case where the heat-and-press bonding portion 1167 performs heat-and-press bonding of the sheet stack, the rack gear 1175 is moved in the pressurizing direction (−Z side) by the driving force transmitted from the motor 1177. As a result of this, the lift plate 1172 and the heater portion 1171 moves in the pressurizing direction (−Z side), and the pressure plate 1169 abuts the sheet stack. In addition, as the compression spring 1181 is compressed, the pressurizing force of the pressure plate 1169 on the sheet stack increases.

Operation of Heat-and-Press Bonding Portion

The heat-and-press bonding operation of the heat-and-press bonding portion 1167 will be described with reference to FIGS. 19A to 19F. FIGS. 19A to 19F are each a diagram illustrating the heat-and-press bonding portion 1167 as viewed in the sheet conveyance direction (Y direction).

Figures 19A, 19B, 19C, 19D, 19E, 19F:
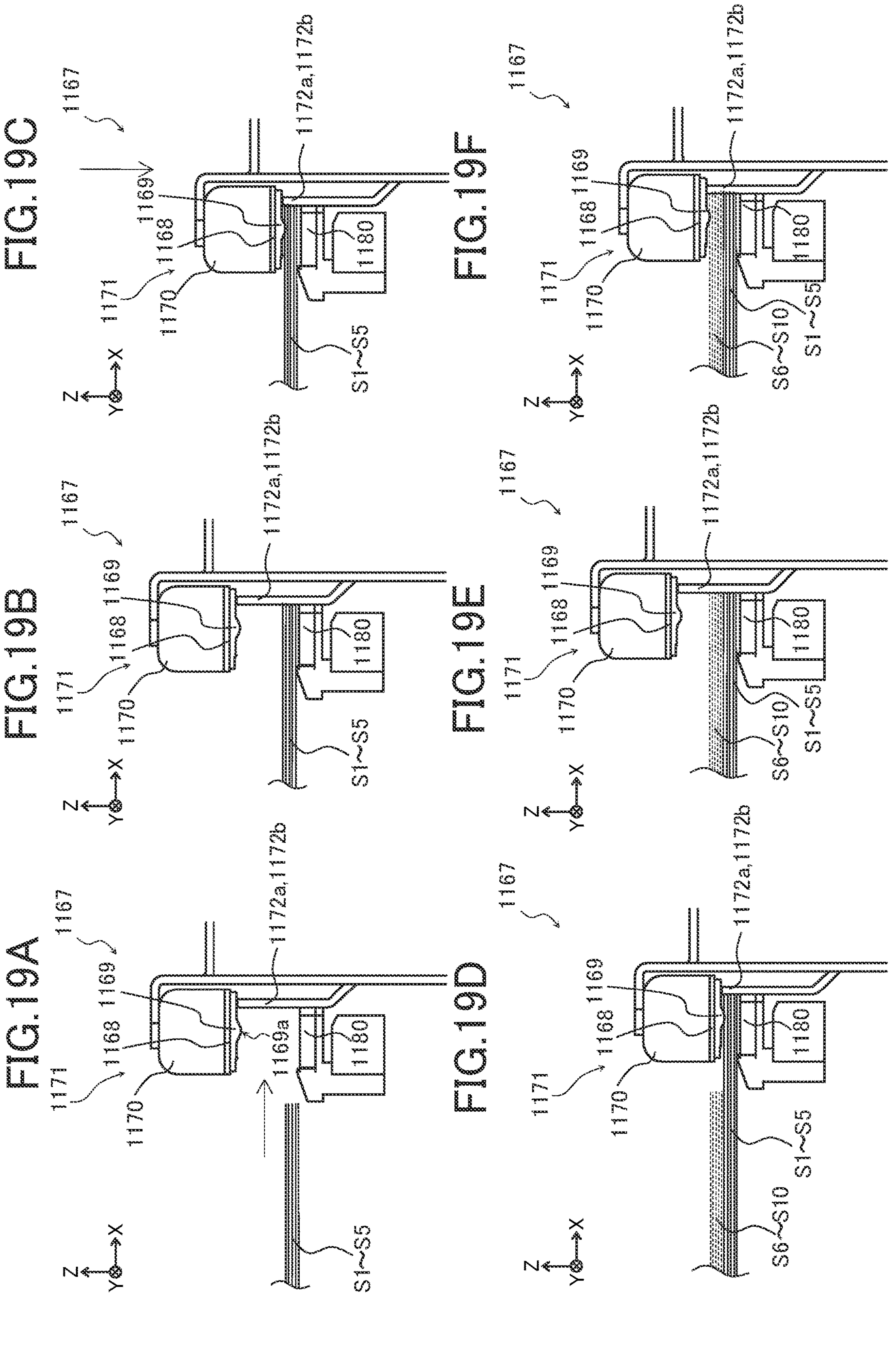
FIGS. 19A to 19F are each a diagram illustrating an operation of the heat-and-press bonding portion according to the sixth embodiment.

FIG. 19A illustrates the same state as FIG. 17C, that is, a state in which the alignment of the sheets S1 to S5 in the sheet conveyance direction (Y direction) is completed. In this state, the heater portion 1171 is at a position separate from the sheet stack in the Z direction.

FIG. 19B illustrates the same state as FIG. 17D, that is, a state in which the alignment of the sheets S1 to S5 in the width direction is completed. The sheets S1 to S5 are aligned in the sheet width direction (X direction) by being caused to abut the width alignment standard plates 1172*a* and 1172*b*.

FIG. 19C illustrates a state in which the heater portion 1171 has been moved in the pressurizing direction (−Z side) by normal rotation of the motor 1177, and the contact surface 1169*a* of the pressure plate 1169 has abutted the uppermost sheet S5.

FIG. 19D illustrates a state in which the driving of the motor 1177 is continued, thus the sheets S1 to S5 are nipped between the pressure plate 1169 and the receiving plate 1180, and heat-and-press bonding of the sheets S1 to S5 is being performed. In addition, FIG. 19D illustrates a state in which the next sheets S6 to S10 have been conveyed to the alignment portion 1156 in parallel with the heat-and-press bonding of the sheets S1 to S5.

FIG. 19E illustrates a state in which the heat-and-press bonding of the sheets S1 to S5 have been completed, the heater portion 1171 has moved (retracted) to the side (+Z side) opposite to the pressurizing direction by reverse rotation of the motor 1177, and thus the pressure plate 1169 has been separated from the sheet S5. In addition, FIG. 19E illustrates a state in which the next sheets S6 to S10 have been aligned, and the sheets S1 to S5 have been caused to abut the width alignment standard plates 1172*a* and 1172*b* after the heater portion 1171 has been retracted.

FIG. 19F illustrates a state in which the heater portion 1171 has been moved in the pressurizing direction (−Z side) again by the normal rotation of the motor 1177, the sheets S1 to S10 are nipped between the pressure plate 1169 and the receiving plate 1180, and the heat-and-press of the sheets S6 to S10 is being performed. Here, a toner image for bonding is formed on the upper surface of the sheet S5 and/or the lower surface of the sheet S6, and thus the sheet stack constituted by the sheets S1 to S5 and the sheet stack constituted by the sheets S6 to S10 are bonded together by heat-and-press bonding.

As described above, the heat-and-press bonding portion 1167 performs the heat-and-press bonding operation once each time a sheet stack of a predetermined number of sheets is aligned by the alignment portion 1156, and thus a booklet formed from sheets of a number larger than a predetermined number of sheets can be manufactured. Although an example in which a booklet formed from ten sheets S1 to S10 is produced has been described herein, a booklet formed from tens or more of sheets may be produced.

When the heat-and-press bonding is completed for all the sheets constituting one copy of booklet, the booklet formed from the sheets S1 to S10 is pushed out by the longitudinal alignment standard plate 1154, and is conveyed in a direction (−Y side) toward the stack discharge roller pair 1136 illustrated in FIG. 11 in the sheet conveyance direction. In other words, the longitudinal alignment standard plate 1154 is an example of a push-out member that pushes out the sheet stack from the alignment portion 1156 and the heat-and-press bonding portion 1167. To be noted, a push-out member that pushes out the processed sheet stack may be provided in addition to the longitudinal alignment standard plate 1154 serving as a standard for aligning the sheet stack.

The stack discharge roller pair 1136 is a roller pair that is capable of opening and closing (coming into and out of contact with each other), and receives the booklet in the separation state. After the leading end of the booklet in the direction in which the longitudinal alignment standard plate 1154 pushes out the booklet has passed the position of the stack discharge roller pair 1136, the movement of the longitudinal alignment standard plate 1154 is stopped, and the stack discharge roller pair 1136 switches to the contact state. As a result of this, the stack discharge roller pair 1136 nips and conveys the booklet, and discharges the booklet onto the discharge lower tray 1137. Meanwhile, the longitudinal alignment standard plate 1154 returns to the standby position after passing the booklet onto the stack discharge roller pair 1136.

Equalizing Mechanism

The heat-and-press bonding portion 1167 includes an equalizing means (inclination correction mechanism or pressure equalizing mechanism) that equalizes the pressurizing force acting on the sheet stack. The configuration of the equalizing means (inclination correction mechanism) that absorbs the relative inclination between the pressure plate 1169 and the receiving plate 1180 will be described for the inclination about the X axis and the inclination about the Y axis.

Inclination Correction about X Axis

Figure 18B:
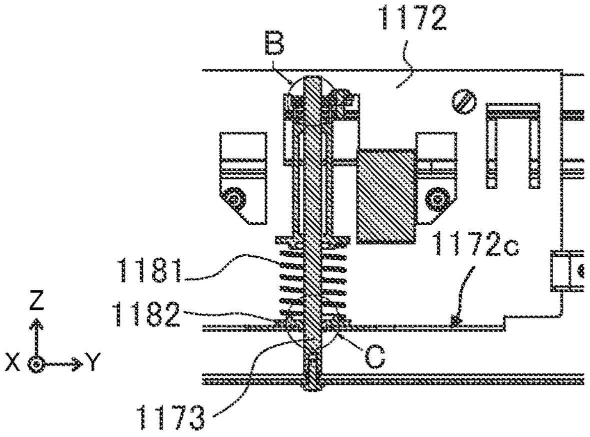
Figure 18C:
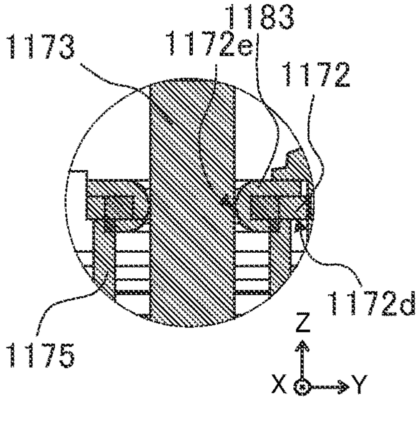
Figure 18D:
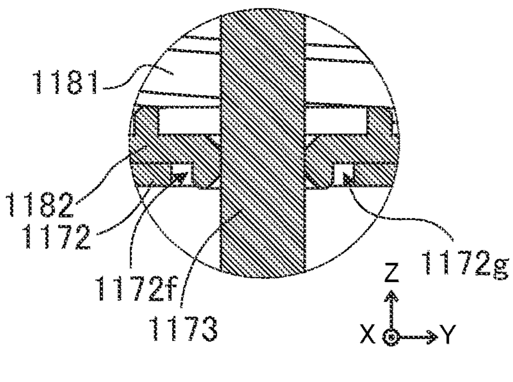

FIG. 18B is a section view illustrating a cross-section of the heat-and-press bonding portion 1167 taken along a plane passing through the axial center of the guide shaft 1173 and orthogonal to the X direction. FIG. 18C is an enlarged view of a region B in FIG. 18B. FIG. 18D is an enlarged view of a region C in FIG. 18B.

As illustrated in FIG. 18C, a sliding member 1183 is attached to the lift plate 1172. The sliding member 1183 has a hole portion in which the guide shaft 1173 is inserted. The lift plate 1172 is fitted on the guide shaft 1173 via the sliding member 1183. The sliding member 1183 can be formed from a material having a lower friction coefficient on the guide shaft 1173 than the friction coefficient of the lift plate 1172 on the guide shaft 1173.

The sliding member 1183 has a contact portion 1172*e* that comes into contact with the outer surface of the guide shaft 1173. In other words, the lift plate 1172 serving as a holding member that holds the pressure plate 1169 (heater portion 1171) is engaged with the guide shaft 1173 at the contact portion 1172*e* serving as an engaging portion.

The contact portion 1172*e* is formed to be in line contact with the guide shaft 1173. In other words, the contact portion 1172*e* has a sectional shape projecting toward the guide shaft 1173 side in a direction (Y direction) orthogonal to the axial direction of the guide shaft 1173 (Z direction) as viewed in the X direction. The sectional shape may be, for example, an arcuate shape or a triangular shape. To be noted, the contact portion 1172*e* may be formed as part of the lift plate 1172.

As illustrated in FIG. 18D, gaps (backlash) 1172*f* and 1172*g* in the Y direction are provided between the lift plate 1172 and the receiving part 1182. In other words, the lift plate 1172 has a hole portion formed such that the gaps 1172*f* and 1172*g* are respectively provided on the −Y side and the +Y side with respect to the receiving part 1182 in a state in which the heater portion 1171 is at the designed standard position (state in which the pressure plate 1169 is not inclined about the X axis). In contrast, a gap (backlash) in the X direction is not provided between the receiving part 1182 and the lift plate 1172.

As described above, the lift plate 1172 is in contact with (engaged with) the guide shaft 1173 at the contact portion 1172*e* of the sliding member 1183, and has a gap (backlash) in the Y direction from the guide shaft 1173 at a position different from the sliding member 1183 in the pressurizing direction (Z direction). Therefore, the lift plate 1172 is allowed to tilt about the X axis by using the contact portion 1172*e* as a fulcrum. As a result of this, the relative inclination about the X axis between the pressure plate 1169 and the receiving plate 1180 can be absorbed. In other words, the support elements (guide shaft 1173, lift plate 1172, and gaps 1172*f* and 1172*g*) that enable the pressure plate 1169 to tilt are examples of a support means or support mechanism (second support means or second support mechanism) that supports the pressurizing member such that the pressurizing member is capable of tilting about an axis extending in the first direction intersecting with the pressurizing direction.

In addition, as described above, the contact surface 1169*a* of the pressure plate 1169 has a ridge portion illustrated in FIG. 19A whose center portion in the Y direction projects toward the receiving plate 1180 in the pressurizing direction (Z direction). Therefore, during heat-and-press bonding, the pressure plate 1169 is substantially in line contact with the sheet stack at the ridgeline portion of the ridge portion. As a result of this, the pressure plate 1169 can absorb the relative inclination about the Y axis between the pressure plate 1169 and the receiving plate 1180.

In addition, in the present embodiment, the receiving plate 1180 serving as a receiving member is formed from silicone rubber, which is an elastic material. Therefore, in combination with the ridge portion of the pressure plate 1169, the relative inclination about the Y axis between the pressure plate 1169 and the receiving plate 1180 can be absorbed more effectively.

As described above, also according to the configuration of the present embodiment, a sheet bonding apparatus, a sheet processing apparatus, and an image forming apparatus that can bond the sheets together more stably can be provided.

Seventh Embodiment

Figure 20:
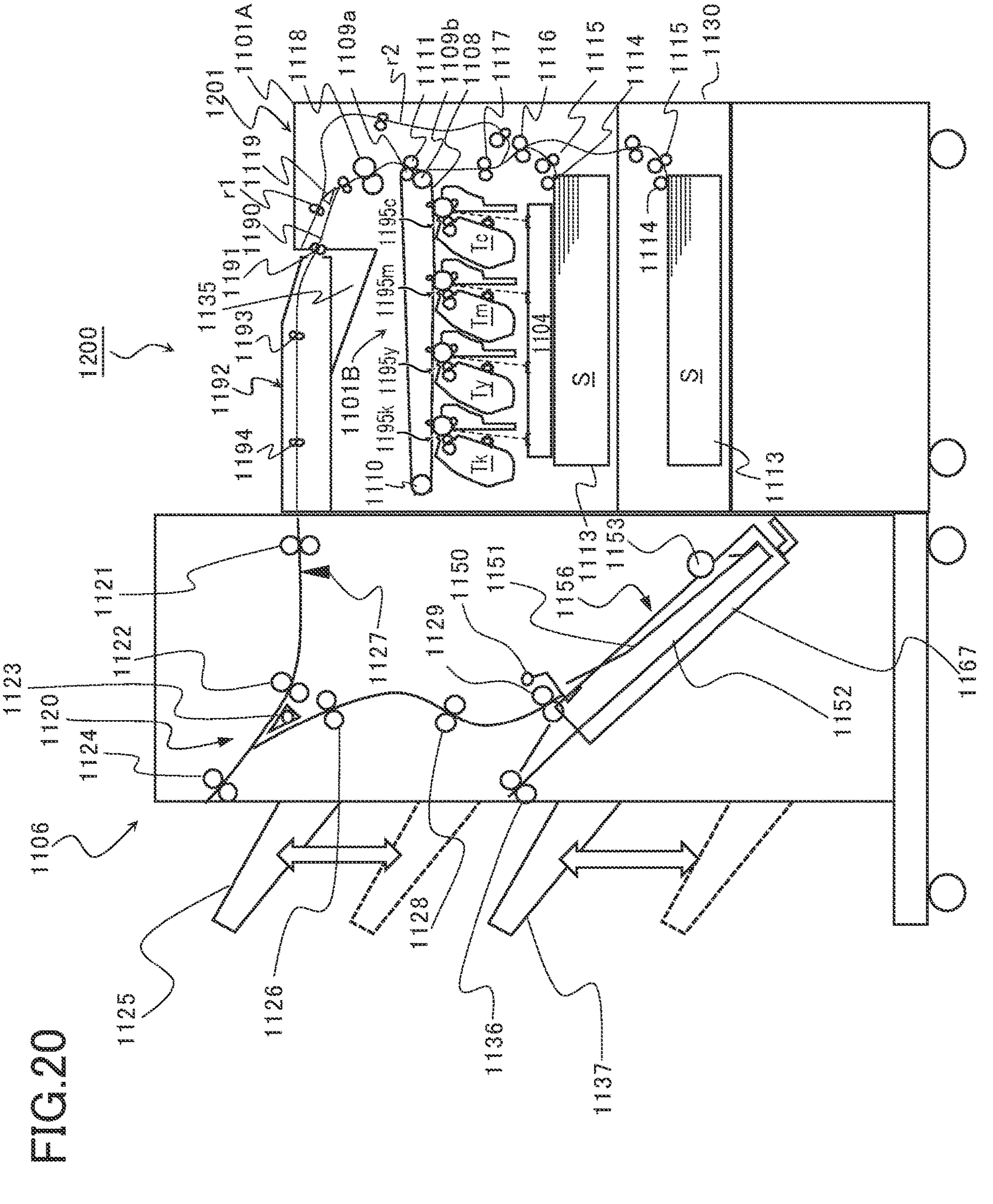
FIG. 20 is a schematic view of an image forming apparatus according to a seventh embodiment.

An image forming apparatus 1200 according to a seventh embodiment will be described with reference to FIG. 20. The present embodiment is different from the sixth embodiment in that a printer body 1201 (image forming apparatus body) has a color printer configuration in which a color image is formed by using toners of a plurality of colors. In the description below, it is assumed that elements denoted by the same reference signs as in the sixth embodiment have substantially the same configurations and effects as those described in the sixth embodiment unless otherwise described, and part different from the sixth embodiment will be mainly described.

An image forming portion 1101B of the printer body 1201 includes four process cartridges 1195*y*, 1195*m*, 1195*c*, and 1195*k* arranged along an intermediate transfer belt 1108. The process cartridges 1195*y*, 1195*m*, 1195*c*, and 1195*k* each may have substantially the same configuration as the process cartridge 1195 of the sixth embodiment except for the toner accommodated therein.

The process cartridge 1195*k* forms a monochromatic image corresponding to a black component of a color image by using black toner Tk. The process cartridge 1195*y* forms a monochromatic image corresponding to a yellow component of the color image by using yellow toner Ty. The process cartridge 1195*m* forms a monochromatic image corresponding to a magenta component of the color image by using magenta toner Tm. The process cartridge 1195*c* forms a monochromatic image corresponding to a cyan component of the color image by using cyan toner Tc.

The monochromatic images respectively formed by the process cartridges 1195*y*, 1195*m*, 1195*c*, and 1195*k* are transferred onto the intermediate transfer belt 1108 through primary transfer so as to be superimposed on each other, and are then transferred onto the sheet through secondary transfer in a secondary transfer portion. Other than this, the image forming operation by the printer body 1201 is the same as in the sixth embodiment.

Here, at least one of the toners of plurality of colors can be used as toner for bonding sheets together. For example, the black toner Tk can be used as both a toner for recording an image on a sheet and a toner for bonding. In this case, the process cartridge 1195*k* forms a monochromatic image corresponding to a black component of the color image, and a bonding toner image 39 illustrated in FIG. 12 to be transferred onto a bonding region of the sheet.

In the case where the image forming apparatus 1200 produces a booklet, a toner image including the bonding toner image 39 is formed on each sheet in the printer body 1201, and then heat-and-press bonding of sheets is performed in the sheet processing apparatus 1106. For the configuration of the sheet processing apparatus 1106, the same configuration as in the sixth embodiment can be employed.

According to the image forming apparatus 1200 of the present embodiment, color printing and bonding processing can be executed by one image forming apparatus. In addition, by using a heat-and-press bonding portion described in the first to sixth embodiments for the sheet processing apparatus 1106, the sheets can be bonded together more stably.

To be noted, although a color printer configuration of a tandem type including four process cartridges has been described as an example in the present embodiment, five or more kinds of toner, or three or less kinds of toner may be used. In addition, instead of a configuration in which at least one of toners of plurality of colors is used as both toner for recording an image on a sheet and toner for bonding, toner dedicated for bonding may be used. In this case, the process cartridge using the toner dedicated for bonding only forms the bonding toner image 39 illustrated in FIG. 12.

According to the present disclosure, a sheet bonding apparatus, a sheet processing apparatus, and an image forming apparatus that can bond sheets together more stably can be provided.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-187696, filed on Nov. 24, 2022, which is hereby incorporated by reference herein in its entirety.

What is claimed is:

1. A sheet bonding apparatus comprising:

a pressurizing member configured to pressurize a sheet stack;

a receiving member configured to receive a pressurizing force of the pressurizing member and nip the sheet stack together with the pressurizing member;

a heating portion configured to heat the pressurizing member;

a pressurizing mechanism configured to press the pressurizing member against the sheet stack; and an inclination correction mechanism configured to correct relative inclination between the pressurizing member and the receiving member in a case where the pressurizing member pressurizes the sheet stack, wherein the inclination correction mechanism includes a support mechanism configured to support the receiving member so as to allow the receiving member to tilt about an axis extending in a first direction intersecting with a pressurizing direction of the pressurizing member.

2. The sheet bonding apparatus according to claim 1, wherein the inclination correction mechanism includes a projection portion provided on a contact surface of the pressurizing member configured to come into contact with the sheet stack, and wherein the projection portion projects toward the receiving member in the pressurizing direction and extends in a second direction intersecting with both the pressurizing direction and the first direction.

3. The sheet bonding apparatus according to claim 1, further comprising:

an urging member configured to urge the receiving member so as to maintain an orientation of the receiving member in a state before the sheet stack is received in a space between the pressurizing member and the receiving member.

4. The sheet bonding apparatus according to claim 1, wherein the support mechanism includes a first shaft portion extending in the first direction, and wherein the receiving member is configured to tilt about the shaft portion.

5. A sheet bonding apparatus comprising:

a pressurizing member configured to pressurize a sheet stack;

a receiving member configured to receive a pressurizing force of the pressurizing member and nip the sheet stack together with the pressurizing member;

a heating portion configured to heat the pressurizing member;

a pressurizing mechanism configured to press the pressurizing member against the sheet stack; and an inclination correction mechanism configured to correct relative inclination between the pressurizing member and the receiving member in a case where the pressurizing member pressurizes the sheet stack, wherein the inclination correction mechanism includes a support mechanism configured to support the pressurizing member such that (1) the pressurizing member is allowed to tilt both in a first tilting direction and a second tilting direction opposite to the first tilting direction about an axis extending in a first direction intersecting with a pressurizing direction of the pressurizing member and (2) the axis is the only one axis extending in the first direction about which the pressurizing member is allowed to tilt.

6. The sheet bonding apparatus according to claim 5, wherein the inclination correction mechanism includes a projection portion provided on a contact surface of the pressurizing member configured to come into contact with the sheet stack, and wherein the projection portion projects toward the receiving member in the pressurizing direction and extends in a second direction intersecting with both the pressurizing direction and the first direction.

7. The sheet bonding apparatus according to claim 6, wherein a contact surface of the receiving member configured to come into contact with the sheet stack is formed from an elastic material configured to elastically deform in accordance with the pressurizing force of the pressurizing member, and wherein the inclination correction mechanism includes the elastic material.

8. The sheet bonding apparatus according to claim 5, further comprising:

an urging member configured to urge the pressurizing member so as to maintain an orientation of the pressurizing member in a state before the sheet stack is received in a space between the pressurizing member and the receiving member.

9. The sheet bonding apparatus according to claim 5, wherein the support mechanism includes a shaft portion extending in the first direction, and wherein the pressurizing member is configured to tilt about the shaft portion.

10. The sheet bonding apparatus according to claim 5, wherein the support mechanism includes a guide shaft extending in the pressurizing direction and a holding member configured to hold the pressurizing member and the heating portion and move along the guide shaft, wherein the holding member includes an engaging portion configured to engage with the guide shaft, wherein a gap is provided between the holding member and the guide shaft at a position different from the engaging portion in the pressurizing direction, and wherein the gap allows the holding member to tilt about an axis extending in the first direction around the engaging portion.

11. A sheet bonding apparatus comprising:

a pressurizing member configured to pressurize a sheet stack;

a receiving member configured to receive a pressurizing force of the pressurizing member and nip the sheet stack together with the pressurizing member;

a heating portion configured to heat the pressurizing member;

a pressurizing mechanism configured to press the pressurizing member against the sheet stack; and an inclination correction mechanism configured to correct relative inclination between the pressurizing member and the receiving member in a case where the pressurizing member pressurizes the sheet stack, wherein the inclination correction mechanism includes a projection portion provided on a contact surface of the pressurizing member configured to come into contact with the sheet stack, and wherein the projection portion projects toward the receiving member in a pressurizing direction of the pressurizing member and extends in a direction intersecting with the pressurizing direction.

12. A sheet bonding apparatus comprising:

a pressurizing member configured to pressurize a sheet stack;

a receiving member configured to receive a pressurizing force of the pressurizing member and nip the sheet stack together with the pressurizing member;

a heating portion configured to heat the pressurizing member;

a pressurizing mechanism configured to press the pressurizing member against the sheet stack; and an inclination correction mechanism configured to correct relative inclination between the pressurizing member and the receiving member in a case where the pressurizing member pressurizes the sheet stack, wherein the inclination correction mechanism includes a support mechanism configured to support one of the pressurizing member or the receiving member so as to allow the one of the pressurizing member or the receiving member to tilt about an axis extending in a first direction intersecting with a pressurizing direction of the pressurizing member and about an axis extending in a second direction intersecting with both the pressurizing direction and the first direction.

13. The sheet bonding apparatus according to claim 12, wherein the support mechanism includes a support portion configured to support the receiving member, wherein the support portion has a sectional shape projecting toward the receiving member in the pressurizing direction in both a cross-section orthogonal to the first direction and a cross-section orthogonal to the second direction, and wherein the receiving member is configured to tilt with a contact portion between the receiving member and the support portion as a fulcrum.

14. A sheet bonding apparatus comprising:

a pressurizing member configured to pressurize a sheet stack;

a receiving member configured to receive a pressurizing force of the pressurizing member and nip the sheet stack together with the pressurizing member;

a heating portion configured to heat the pressurizing member;

a pressurizing mechanism configured to press the pressurizing member against the sheet stack; and an inclination correction mechanism configured to correct relative inclination between the pressurizing member and the receiving member in a case where the pressurizing member pressurizes the sheet stack, wherein the inclination correction mechanism includes a projection shape provided on a contact surface of the pressurizing member configured to come into contact with the sheet stack, and wherein the projection shape has a sectional shape projecting toward the receiving member in a pressurizing direction of the pressurizing member in both a cross-section orthogonal to a first direction intersecting with the pressurizing direction and a cross-section orthogonal to a second direction intersecting with both the pressurizing direction and the first direction.

* * * * *